United States Patent
Salunke et al.

(10) Patent No.: US 11,949,703 B2
(45) Date of Patent: Apr. 2, 2024

(54) SYSTEMS AND METHODS FOR MULTIVARIATE ANOMALY DETECTION IN SOFTWARE MONITORING

(71) Applicant: Oracle International Corporation, Redwood Shores, CA (US)

(72) Inventors: Sampanna Shahaji Salunke, Dublin, CA (US); Dario Bahena Tapia, Tlaquepaque (MX); Dustin Garvey, Exeter, NH (US); Sumathi Gopalakrishnan, Fremont, CA (US); Neil Goodman, San Rafael, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/055,773

(22) Filed: Nov. 15, 2022

(65) Prior Publication Data
US 2023/0075486 A1 Mar. 9, 2023

Related U.S. Application Data

(62) Division of application No. 16/400,392, filed on May 1, 2019, now Pat. No. 11,533,326.

(51) Int. Cl.
*H04L 29/06* (2006.01)
*G06F 18/2411* (2023.01)
(Continued)

(52) U.S. Cl.
CPC ...... *H04L 63/1425* (2013.01); *G06F 18/2411* (2023.01); *G06N 20/10* (2019.01)

(58) Field of Classification Search
CPC ............. H04L 63/1425; G06F 18/2411; G06F 18/217; G06N 20/10; G05B 23/0221
See application file for complete search history.

(56) References Cited

U.S. PATENT DOCUMENTS 6,298,063 B1 10/2001 Coile et al.
6,438,592 B1 8/2002 Killian
(Continued)

FOREIGN PATENT DOCUMENTS

CN 105426411 A 3/2016
CN 109359763 A 2/2019
(Continued)

OTHER PUBLICATIONS

"OpenStack Compute Administration Manual", Mar. 1, 2011 (Mar. 1, 2011), XP055207492, Retrieved from the Internet: URL:http://web.archive.org/web/20110708071910/http://docs.openstack.org/bexar/openstack-compute/admin/os-compute-admin-book-bexar.pdf [retrieved on Aug. 12, 2015].
(Continued)

*Primary Examiner* — Ka Shan Choy
(74) *Attorney, Agent, or Firm* — Invoke

(57) ABSTRACT

Techniques are disclosed for summarizing, diagnosing, and correcting the cause of anomalous behavior in computing systems. In some embodiments, a system identifies a plurality of time series that track different metrics over time for a set of one or more computing resources. The system detects a first set of anomalies in a first time series that tracks a first metric and assigns a different respective range of time to each anomaly. The system determines whether the respective range of time assigned to an anomaly overlaps with timestamps or ranges of time associated with anomalies from one or more other time series. The system generates at least one cluster that groups metrics based on how many anomalies have respective ranges of time and/or timestamps that overlap. The system may preform, based on the cluster, one or more automated actions for diagnosing or correcting a cause of anomalous behavior.

20 Claims, 10 Drawing Sheets

(51) Int. Cl.
  *G06N 20/10* (2019.01)
  *H04L 9/40* (2022.01)

(56) References Cited

U.S. PATENT DOCUMENTS

| | | |
|---|---|---|
| 6,597,777 B1 | 7/2003 | Ho |
| 6,643,613 B2 | 11/2003 | McGee et al. |
| 6,996,599 B1 | 2/2006 | Anders et al. |
| 7,343,375 B1 | 3/2008 | Dulac |
| 7,529,991 B2 | 5/2009 | Ide et al. |
| 7,672,814 B1 | 3/2010 | Raanan et al. |
| 7,739,143 B1 | 6/2010 | Dwarakanath et al. |
| 7,739,284 B2 | 6/2010 | Aggarwal et al. |
| 7,783,510 B1 | 8/2010 | Gilgur et al. |
| 7,987,106 B1 | 7/2011 | Aykin |
| 8,200,454 B2 | 6/2012 | Dorneich et al. |
| 8,229,876 B2 | 7/2012 | Roychowdhury |
| 8,234,236 B2 | 7/2012 | Beaty et al. |
| 8,363,961 B1 | 1/2013 | Avidan et al. |
| 8,576,964 B2 | 11/2013 | Taniguchi et al. |
| 8,583,649 B2 | 11/2013 | Ailon et al. |
| 8,635,328 B2 | 1/2014 | Corley et al. |
| 8,650,299 B1 | 2/2014 | Huang et al. |
| 8,676,964 B2 | 3/2014 | Gopalan et al. |
| 8,694,969 B2 | 4/2014 | Bernardini et al. |
| 8,776,066 B2 | 7/2014 | Krishnamurthy et al. |
| 8,880,525 B2 | 11/2014 | Galle et al. |
| 8,930,757 B2 | 1/2015 | Nakagawa |
| 8,949,677 B1 | 2/2015 | Brundage et al. |
| 9,002,774 B2 | 4/2015 | Karlsson |
| 9,053,171 B2 | 6/2015 | Ailon et al. |
| 9,141,914 B2 | 9/2015 | Mswanathan et al. |
| 9,147,167 B2 | 9/2015 | Urmanov et al. |
| 9,195,563 B2 | 11/2015 | Scarpelli |
| 9,218,232 B2 | 12/2015 | Khalastchi et al. |
| 9,292,408 B2 | 3/2016 | Bernstein et al. |
| 9,323,599 B1 | 4/2016 | Iyer et al. |
| 9,323,837 B2 | 4/2016 | Zhao et al. |
| 9,330,119 B2 | 5/2016 | Chan et al. |
| 9,355,357 B2 | 5/2016 | Hao et al. |
| 9,367,382 B2 | 6/2016 | Yabuki |
| 9,389,946 B2 | 7/2016 | Higuchi |
| 9,471,778 B1 | 10/2016 | Seo et al. |
| 9,495,220 B2 | 11/2016 | Talyansky |
| 9,495,395 B2 | 11/2016 | Chan et al. |
| 9,507,718 B2 | 11/2016 | Rash et al. |
| 9,514,213 B2 | 12/2016 | Wood et al. |
| 9,529,630 B1 | 12/2016 | Fakhouri et al. |
| 9,658,910 B2 | 5/2017 | Poola et al. |
| 9,658,916 B2 | 5/2017 | Yoshinaga et al. |
| 9,692,662 B2 | 6/2017 | Chan et al. |
| 9,710,493 B2 | 7/2017 | Wang et al. |
| 9,727,533 B2 | 8/2017 | Thibaux |
| 9,740,402 B2 | 8/2017 | Manoharan et al. |
| 9,779,361 B2 | 10/2017 | Jones et al. |
| 9,811,394 B1 | 11/2017 | Kogias et al. |
| 9,961,571 B2 | 5/2018 | Yang et al. |
| 10,073,906 B2 | 9/2018 | Lu et al. |
| 10,210,036 B2 | 2/2019 | Iyer et al. |
| 10,367,843 B1 | 7/2019 | Mezic |
| 10,692,255 B2 | 6/2020 | Garvey et al. |
| 11,386,075 B2 | 7/2022 | Schierz et al. |
| 2002/0019860 A1 | 2/2002 | Lee et al. |
| 2002/0092004 A1 | 7/2002 | Lee et al. |
| 2002/0183972 A1 | 12/2002 | Enck et al. |
| 2002/0188650 A1 | 12/2002 | Sun et al. |
| 2003/0149603 A1 | 8/2003 | Ferguson et al. |
| 2003/0224344 A1 | 12/2003 | Shamir et al. |
| 2004/0088406 A1 | 5/2004 | Corley et al. |
| 2005/0119982 A1 | 6/2005 | Ito et al. |
| 2005/0132030 A1 | 6/2005 | Hopen et al. |
| 2005/0159927 A1 | 7/2005 | Cruz et al. |
| 2005/0193281 A1 | 9/2005 | Ide et al. |
| 2006/0087962 A1 | 4/2006 | Golia et al. |
| 2006/0106743 A1 | 5/2006 | Horvitz |
| 2006/0212593 A1 | 9/2006 | Patrick et al. |
| 2006/0287848 A1 | 12/2006 | Li et al. |
| 2007/0011281 A1 | 1/2007 | Jhoney et al. |
| 2007/0150329 A1 | 6/2007 | Brook et al. |
| 2007/0179836 A1 | 8/2007 | Juang et al. |
| 2008/0221974 A1 | 9/2008 | Gilgur et al. |
| 2008/0288089 A1 | 11/2008 | Pettus et al. |
| 2009/0030752 A1 | 1/2009 | Senturk-Doganaksoy et al. |
| 2010/0027552 A1 | 2/2010 | Hill |
| 2010/0036857 A1 | 2/2010 | Marvasti et al. |
| 2010/0050023 A1 | 2/2010 | Scarpelli et al. |
| 2010/0082132 A1 | 4/2010 | Marruchella et al. |
| 2010/0082697 A1 | 4/2010 | Gupta et al. |
| 2010/0185499 A1 | 7/2010 | Dwarakanath et al. |
| 2010/0257133 A1 | 10/2010 | Crowe et al. |
| 2010/0324869 A1 | 12/2010 | Cherkasova et al. |
| 2011/0022879 A1 | 1/2011 | Chavda et al. |
| 2011/0040575 A1 | 2/2011 | Wright et al. |
| 2011/0125894 A1 | 5/2011 | Anderson et al. |
| 2011/0126197 A1 | 5/2011 | Larsen et al. |
| 2011/0126275 A1 | 5/2011 | Anderson et al. |
| 2011/0213788 A1 | 9/2011 | Zhao et al. |
| 2011/0265164 A1 | 10/2011 | Lucovsky et al. |
| 2012/0005359 A1 | 1/2012 | Seago et al. |
| 2012/0051369 A1 | 3/2012 | Bryan et al. |
| 2012/0066389 A1 | 3/2012 | Hegde et al. |
| 2012/0110462 A1 | 5/2012 | Eswaran et al. |
| 2012/0110583 A1 | 5/2012 | Balko et al. |
| 2012/0203823 A1 | 8/2012 | Manglik et al. |
| 2012/0240072 A1 | 9/2012 | Altamura et al. |
| 2012/0254183 A1 | 10/2012 | Ailon et al. |
| 2012/0278663 A1 | 11/2012 | Hasegawa |
| 2012/0323988 A1 | 12/2012 | Barzel et al. |
| 2013/0024173 A1 | 1/2013 | Brzezicki et al. |
| 2013/0080374 A1 | 3/2013 | Karlsson |
| 2013/0151179 A1 | 6/2013 | Gray |
| 2013/0326202 A1 | 12/2013 | Rosenthal et al. |
| 2013/0329981 A1 | 12/2013 | Hiroike |
| 2014/0058572 A1 | 2/2014 | Stein et al. |
| 2014/0067757 A1 | 3/2014 | Ailon et al. |
| 2014/0095422 A1 | 4/2014 | Solomon et al. |
| 2014/0101300 A1 | 4/2014 | Rosensweig et al. |
| 2014/0215470 A1 | 7/2014 | Iniguez |
| 2014/0310235 A1 | 10/2014 | Chan et al. |
| 2014/0310714 A1 | 10/2014 | Chan et al. |
| 2014/0325649 A1 | 10/2014 | Zhang |
| 2014/0379301 A1* | 12/2014 | Shastri ............ G06F 17/18 702/183 |
| 2014/0379717 A1 | 12/2014 | Urmanov et al. |
| 2015/0032775 A1 | 1/2015 | Yang et al. |
| 2015/0033084 A1 | 1/2015 | Sasturkar et al. |
| 2015/0040142 A1 | 2/2015 | Cheetancheri et al. |
| 2015/0046123 A1 | 2/2015 | Kato |
| 2015/0046920 A1 | 2/2015 | Allen |
| 2015/0058982 A1* | 2/2015 | Eskin ............... G06F 16/84 726/23 |
| 2015/0065121 A1 | 3/2015 | Gupta et al. |
| 2015/0180734 A1 | 6/2015 | Maes et al. |
| 2015/0242243 A1 | 8/2015 | Balakrishnan et al. |
| 2015/0244597 A1 | 8/2015 | Maes et al. |
| 2015/0248446 A1 | 9/2015 | Nordstrom et al. |
| 2015/0251074 A1 | 9/2015 | Ahmed et al. |
| 2015/0296030 A1 | 10/2015 | Maes et al. |
| 2015/0302318 A1 | 10/2015 | Chen et al. |
| 2015/0312274 A1 | 10/2015 | Bishop et al. |
| 2015/0317589 A1 | 11/2015 | Anderson et al. |
| 2016/0034328 A1 | 2/2016 | Poola et al. |
| 2016/0042289 A1 | 2/2016 | Poola et al. |
| 2016/0092516 A1 | 3/2016 | Poola et al. |
| 2016/0105327 A9 | 4/2016 | Cremonesi et al. |
| 2016/0139964 A1 | 5/2016 | Chen et al. |
| 2016/0149936 A1* | 5/2016 | Pegna ............... G06F 21/552 726/23 |
| 2016/0171037 A1 | 6/2016 | Mathur et al. |
| 2016/0253381 A1 | 9/2016 | Kim et al. |
| 2016/0283533 A1 | 9/2016 | Urmanov et al. |
| 2016/0292611 A1 | 10/2016 | Boe et al. |
| 2016/0294773 A1 | 10/2016 | Yu et al. |
| 2016/0299938 A1 | 10/2016 | Malhotra et al. |

(56) References Cited

U.S. PATENT DOCUMENTS

| | | | |
|---|---|---|---|
| 2016/0299961 A1 | 10/2016 | Olsen | |
| 2016/0321588 A1 | 11/2016 | Das et al. | |
| 2016/0342909 A1 | 11/2016 | Chu et al. | |
| 2016/0357674 A1 | 12/2016 | Waldspurger et al. | |
| 2016/0378809 A1 | 12/2016 | Chen et al. | |
| 2017/0061321 A1 | 3/2017 | Maiya et al. | |
| 2017/0249564 A1 | 8/2017 | Garvey et al. | |
| 2017/0249648 A1 | 8/2017 | Garvey et al. | |
| 2017/0249649 A1 | 8/2017 | Garvey et al. | |
| 2017/0249763 A1 | 8/2017 | Garvey et al. | |
| 2017/0262223 A1 | 9/2017 | Dalmatov et al. | |
| 2017/0329660 A1 | 11/2017 | Salunke et al. | |
| 2017/0351563 A1 | 12/2017 | Miki et al. | |
| 2017/0353480 A1 | 12/2017 | Gao et al. | |
| 2017/0364851 A1 | 12/2017 | Maheshwari et al. | |
| 2018/0026907 A1 | 1/2018 | Miller et al. | |
| 2018/0039555 A1 | 2/2018 | Salunke et al. | |
| 2018/0052804 A1 | 2/2018 | Mikami et al. | |
| 2018/0053207 A1 | 2/2018 | Modani et al. | |
| 2018/0059628 A1 | 3/2018 | Yoshida | |
| 2018/0081629 A1 | 3/2018 | Kuhhirte et al. | |
| 2018/0219889 A1 | 8/2018 | Oliner et al. | |
| 2018/0321989 A1 | 11/2018 | Shetty et al. | |
| 2018/0324199 A1 | 11/2018 | Crotinger et al. | |
| 2018/0330433 A1 | 11/2018 | Frenzel et al. | |
| 2019/0042982 A1 | 2/2019 | Qu et al. | |
| 2019/0065275 A1 | 2/2019 | Wong et al. | |
| 2019/0138938 A1 | 5/2019 | Vasseur et al. | |
| 2019/0305876 A1 | 10/2019 | Sundaresan et al. | |
| 2019/0373007 A1* | 12/2019 | Salunke | G06F 11/3423 |
| 2020/0034745 A1 | 1/2020 | Nagpal et al. | |
| 2020/0089886 A1* | 3/2020 | Oetken | G06F 21/565 |
| 2020/0134510 A1 | 4/2020 | Basel et al. | |
| 2020/0236112 A1 | 7/2020 | Pularikkal et al. | |
| 2020/0250477 A1 | 8/2020 | Barthur | |
| 2020/0267057 A1* | 8/2020 | Garvey | H04L 41/0816 |

FOREIGN PATENT DOCUMENTS

| | | |
|---|---|---|
| JP | 2006-129446 A | 5/2006 |
| WO | 2011/071624 A2 | 6/2011 |
| WO | 2013/016584 A1 | 1/2013 |

OTHER PUBLICATIONS

"OpenStack Object Storage Administrator Manual", Jun. 2, 2011 (Jun. 2, 2011), XP055207490, Retrieved from the Internet: URL:http://web.archive.org/web/20110727190919/http://docs.openstack.org/cactus/openstack-object-storage/admin/os-objectstorage-adminguide-cactus.pdf [retrieved on Aug. 12, 2015].

Ahmed, Reservoir-based network traffic stream summarization for anomaly detection, Article in Pattern Analysis and Applications, Oct. 2017.

Alberto Zuin: "OpenNebula Setting up High Availability in OpenNebula with LVM", May 2, 2011 (May 2, 2011), XP055207701, Retrieved from the Internet: URL:http://opennebula.org/setting-up-highavailability-in-opennebula-with-lvm/ [retrieved on Aug. 13, 2015] p. 1.

Andrew Beekhof: "Clusters from Scratch—Apache, DRBD and GFS2 Creating Active/Passive and Active/Active Clusters on Fedora 12", Mar. 11, 2010 (Mar. 11, 2010), XP055207651, Retrieved from the Internet: URL:http://clusterlabs.org/doc/en-US/Pacemaker/1.0/pdf/Clusters from Scratch/Pacemaker-1.0-Clusters from Scratch-en-US.pdi [retrieved on Aug. 13, 2015].

Anonymous: "High Availability for the Ubuntu Enterprise Cloud (UEC)—Cloud Controller (CLC)", Feb. 19, 2011 (Feb. 19, 2011), XP055207708, Retrieved from the Internet: URL:http://blog.csdn.net/superxgl/article/details/6194473 [retrieved on Aug. 13, 2015] p. 1.

Charapko, Gorilla—Facebook's Cache for Time Series Data, http://charap.co/gorilla-facebooks-cache-for-monitoring-data/, Jan. 11, 2017.

Chris Bunch et al: "AppScale: Open-Source Platform-As-A-Service", Jan. 1, 2011 (Jan. 1, 2011), XP055207440, Retrieved from the Internet: URL:http://128.111.41.26/research/tech reports/reports/2011-01 .pdf [retrieved on Aug. 12, 2015] pp. 2-6.

Davies, David L., et al., "A Cluster Separation measure", IEEE Transactions on Pattern Analysis and Machine Intelligence, vol. PAMI-1, No. 2, Apr. 1979, pp. 224-227.

Faraz Rasheed, "A Framework for Periodic Outlier Pattern Detection in Time-Series Sequences," May 2014, IEEE.

Greenwald et al. "Space-efficient online computation of quantile summaries." ACM Proceedings of the 2001 SIGMOD international conference on Management of data pp. 58-66.

Greunen, "Forecasting Methods for Cloud Hosted Resources, a comparison," 2015, 11th International Conference on Network and Service Management (CNSM), pp. 29-35 (Year: 2015).

Gueyoung Jung et al: "Performance and availability aware regeneration for cloud based multitier applications", Dependable Systems and Networks (DSN), 2010 IEEE/IFIP International Conference on, IEEE, Piscataway, NJ, USA, Jun. 28, 2010 (Jun. 28, 2010), pp. 497-506.

Gunter et al., Log Summarization and Anomaly Detection for Troubleshooting Distributed Systems, Conference: 8th IEEE/ACM International Conference on Grid Computing (GRID 2007), Sep. 19-21, 2007, Austin, Texas, USA, Proceedings.

Hao et al., Visual Analytics of Anomaly Detection in Large Data Streams, Proc. SPIE 7243, Visualization and Data Analysis 2009, 10 pages.

Haugen et al., "Extracting Common Time Trends from Concurrent Time Series: Maximum Autocorrelation Factors with Applications", Stanford University, Oct. 20, 2015, pp. 1-38.

Herbst, "Self-adaptive workload classification and forecasting for proactive resource provisioning", 2014, ICPE'13, pp. 187-198 (Year: 2014).

Jain and Chlamtac, P-Square Algorithm for Dynamic Calculation of Quantiles and Histograms Without Storing Observations, ACM, Oct. 1985 (10 pages).

Jarvis, R. A., et al., "Clustering Using a Similarity Measure Based on Shared Neighbors", IEEE Transactions on Computers, vol. C-22, No. 11, Nov. 1973, pp. 1025-1034.

Li et al., "Forecasting Web Page Views: Methods and Observations," in 9 J. Machine Learning Res. 2217-50 (2008). (Year: 2008).

Lin, Xuemin, et al. "Continuously maintaining quantile summaries of the most recent n elements over a data stream," IEEE, 2004.

Niino, Junichi, "Open Source Cloud Infrastructure 'OpenStack', its History and Scheme", Available online at <http://www.publickey1.jp/blog/11/openstack_1.html>, Jun. 13, 2011, 18 pages (9 pages of English Translation and 9 pages of Original Document).

Nurmi D et al: "The Eucalyptus Open-Source Cloud-Computing System", Cluster Computing and the Grid, 2009. CCGRID '09. 9th IEEE/ACM International Symposium on, IEEE, Piscataway, NJ, USA, May 18, 2009 (May 18, 2009), pp. 124-131.

Qiu, Hai, et al. "Anomaly detection using data clustering and neural networks." Neural Networks, 2008. IJCNN 2008.(IEEE World Congress on Computational Intelligence). IEEE International Joint Conference on. IEEE, 2008.

Slipetskyy, Rostyslav, "Security Issues in OpenStack", Master's Thesis, Technical University of Denmark, Jun. 2011, 90 pages.

Somlo, Gabriel, et al., "Incremental Clustering for Profile Maintenance in Information Gathering Web Agents", Agents '01, Montreal, Quebec, Canada, May 28-Jun. 1, 2001, pp. 262-269.

Suntinger, "Trend-based similarity search in time-series data," 2010, Second International Conference on Advances in Databases, Knowledge, and Data Applications, IEEE, pp. 97-106 (Year: 2010).

Szmit et al., "Usage of Modified Holt-Winters Method in the Anomaly Detection of Network Traffic: Case Studies", Journal of Computer Networks and Communications, vol. 2012, Article ID 192913, Mar. 29, 2012, pp. 1-5.

Taylor J W et al: "Forecasting intraday time series with multiple seasonal cycles using parsimonious seasonal exponential smoothing", OMEGA, vol. 40, No. 6, Dec. 2012 (Dec. 2012), pp. 748-757.

Time Series Pattern Search: A tool to extract events from time series data, available online at<https://www.ceadar.ie/pages/time-series-pattern-search/>, retrieved on Apr. 24, 2020, 4 pages.

(56) References Cited

OTHER PUBLICATIONS

Voras et al., "Criteria for evaluation of Open Source Cloud Computing Solutions", Information Technology Interfaces (ITI), Proceedings of the ITI2011 33rd International Conference on Information Technology Interfaces, US, IEEE, Jun. 27-30, 2011, pp. 137-142.

Voras I et al: "Evaluating open-source cloud computing solutions", MIPRO, 2011 Proceedings of the 34th International Convention, IEEE, May 23, 2011 (May 23, 2011), pp. 209-214.

Wilks, Samuel S. "Determination of sample sizes for setting tolerance limits," The Annals of Mathematical Statistics 12.1 (1941): 91-96.

Willy Tarreau: "HAProxy Architecture Guide", May 25, 2008 (May 25, 2008), XP055207566, Retrieved from the Internet: URL:http://www.haproxy.org/download/1.2/doc/architecture.txt [retrieved on Aug. 13, 2015].

Yin, "System resource utilization analysis and prediction for cloud based applications under bursty workloads," 2014, Information Sciences, vol. 279, pp. 338-357 (Year: 2014).

Yokoyama, Tetsuya, "Windows Server 2008, Certification Test, Part 5: Reliability", Apr. 15, 2008, pp. 124-125 along with 4 pages of English Translation.

\* cited by examiner

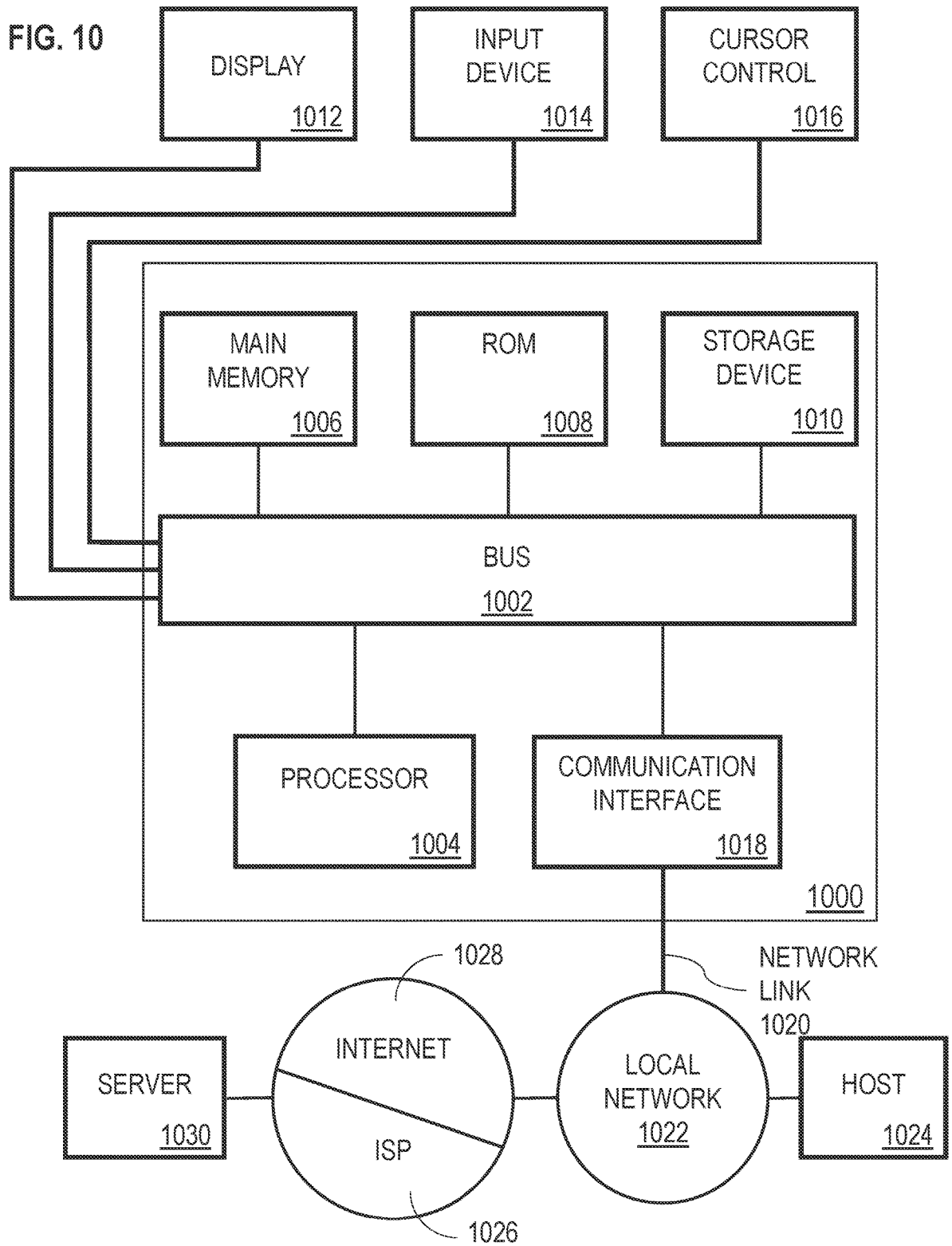

SYSTEMS AND METHODS FOR MULTIVARIATE ANOMALY DETECTION IN SOFTWARE MONITORING

INCORPORATION BY REFERENCE; DISCLAIMER

The following applications are hereby incorporated by reference: U.S. application Ser. No. 15/609,938, titled "SYSTEMS AND METHODS FOR MULTIVARIATE ANOMALY DETECTION IN SOFTWARE MONITORING"; U.S. application Ser. No. 15/609,938, titled "UNSUPERVISED METHOD FOR BASELINING AND ANOMALY DETECTION IN TIME-SERIES DATA FOR ENTERPRISE SYSTEMS"; U.S. application Ser. No. 15/140,358, now U.S. Pat. No. 10,073,906, entitled "SCALABLE TRI-POINT ARBITRATION AND CLUSTERING"; and U.S. application Ser. No. 15/155,486, entitled "CORRELATION-BASED ANALYTIC FOR TIME-SERIES DATA". The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to anomaly detection systems and methods. In particular, the present disclosure relates to detecting, summarizing, and responding to anomalies in complex computing applications comprising a plurality of interrelated resources.

BACKGROUND

System administrators are often responsible for monitoring computing applications to detect divergence from expected patterns of behavior. Many modern computing applications are difficult to monitor due to the number and complexity of the underlying application entities. For example, a cloud service may include load balancers, web servers, application logic, database servers, and other software and hardware resources deployed across different application tiers. Adding to the complexity, the performance of one entity is often interdependent on other entities associated with the application. As a result, promptly detecting and responding to the root cause of anomalous behavior is a challenging task. A failure to timely identify and respond to anomalies may result in various problems such as performance degradation, security breaches, and compromised data integrity.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 10 shows a block diagram that illustrates a computer system in accordance with some embodiments.

DETAILED DESCRIPTION

Figure 1:
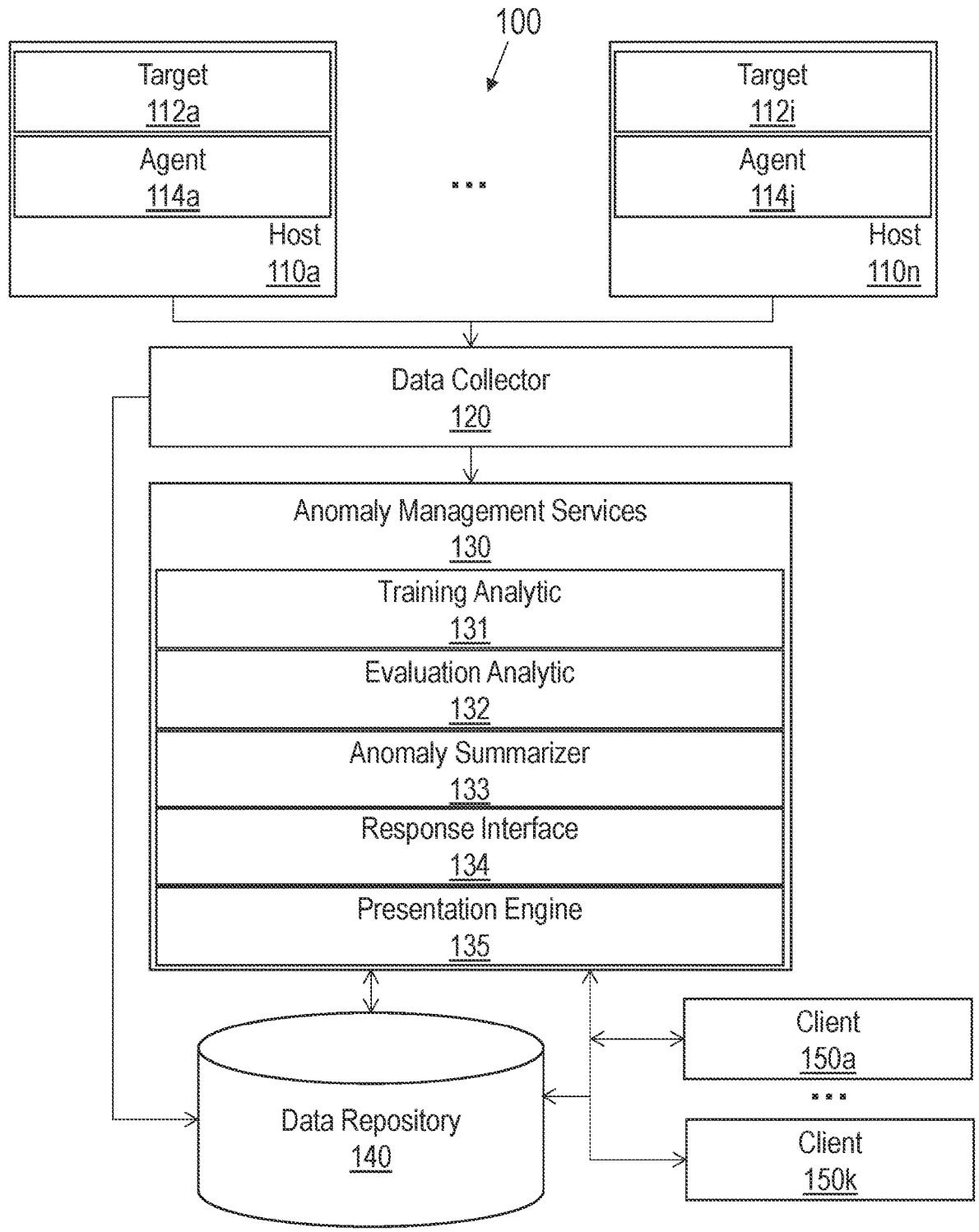
FIG. 1 illustrates an example anomaly detection system in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1.0 GENERAL OVERVIEW
2.0 SYSTEM ARCHITECTURE
3.0 MODEL TRAINING MODES AND PROCESSES
   3.1 TRAINING PROCESS OVERVIEW
   3.2 BIASED SAMPLING AND AUTOMATIC LABELING
   3.3 MACHINE-ASSISTED LABELING
   3.4 FULLY SUPERVISED TRAINING
   3.5 TRANSITIONS BETWEEN UNSUPERVISED AND SUPERVISED TRAINING
4.0 ANOMALY DETECTION AND CLASSIFICATION
   4.1 EVALUATION PROCESS OVERVIEW
   4.2 ANOMALY LABELING AND PREDICTION
5.0 COMPUTER NETWORKS AND CLOUD NETWORKS
6.0 MICROSERVICE APPLICATIONS
7.0 HARDWARE OVERVIEW
8.0 MISCELLANEOUS; EXTENSIONS

1.0 General Overview

Manual detection of anomalous behavior is not practicable or scalable to large and complex systems. System administrators generally do not have the bandwidth to concurrently monitor several different resources on a continuous basis or the expertise to identify all instances of divergent behavior. System administrators may use assistive tools, such as statistical anomaly detectors, to facilitate monitoring. However, these assistive tools typically suffer from several shortcomings. As an example, statistical anomaly detectors are often designed to monitor individual resources, providing little to no information on how anomalies between interdependent resources may be related. Consequently, alerts generated by statistical anomaly detectors may still rely on system administrators to try and stitch together how individual anomalies relate to the overall performance of an application.

Other shortcomings of statistical anomaly detectors include their proclivity to generate false positives and to lack information about the significance of a detected anomaly. In large-scale systems, a system administrator may be inundated with alerts of anomalous behavior without any information about the best approach for resolving any detected issues. The system administrators may attempt to address the alerts one-by-one in the order that the alerts were triggered. However, this approach is generally inefficient and difficult to scale. The administrator may not have enough bandwidth to process all the alerts in a timely manner. Further, many of the alerts may be false positives, tangential to the root cause of a problem, redundant, and/or otherwise low priority.

Statistical anomaly detectors may employ machine learning to provide a more adaptive and robust anomaly detection. One example approach is to automatically learn relationships between an independent variable and a dependent variable by fitting observed data points to a correlation-based model. The trained correlation-based model may then be used to make estimates for the dependent variable as a function of the independent variable. Estimates may be compared with observed data points to determine whether the dependent variable is experiencing anomalous behavior. This approach works well in simple systems where the behavior of one variable is highly dependent on another variable. However, in complex systems, such as multi-tier software applications, multiple behaviors and dependencies may exist in the data. The correlation-based technique is typically limited to learning just one or two of the behaviors. As a result, the correlation-based technique may model behavioral patterns in an incomplete or incorrect manner, leading to a large number of false positives and/or a failure to flag significant anomalies.

Machine-learning techniques are also complicated by a tendency to rely on supervised training. With supervised training, models are trained as a function of labeled data. For instance, a user may label examples of anomalous and unanomalous behavior. A supervised machine learning process may then train the model by inferring a function from the labeled training data. The trained model may be used to classify new examples as anomalous or unanomalous. One challenge with this approach is the amount of time it takes to collect and label enough data. Too few data points may result in an overfitted model that does not generalize well and fails to reliably classify future examples that have not yet been seen. Further, requiring a user to label a sufficient number of data points may be a cumbersome and inefficient process. Thus, supervised training may increase the barrier to entry in obtaining an accurate and robust anomaly detection model.

Techniques are described herein for training and evaluating anomaly detection models using machine learning. The techniques allow for transitions between unsupervised, machine-assisted supervised (also referred to herein as semi-supervised), and/or completely supervised training. When operating in an unsupervised manner, the anomaly detection system may train a model with little to no input from a user.

In particular, the anomaly detection system may train the anomaly detection model without receiving any user-set labels for the training data. The unsupervised stage may instead train an anomaly detection model as a function of labels that have been automatically assigned. Operating in an unsupervised manner allows the system to provide nearly instantaneous anomaly detection which is generally not achievable with a purely supervised approach. Further, the burden on end users to provide labeled training data is alleviated as labels are automatically assigned.

In some embodiments, when operating in an unsupervised mode, the anomaly detection system is configured to learn less observed behavior without reaching the extreme of learning of observation as less observed behavior. Additionally or alternatively, the anomaly detection system may be configured to analyze and detect conditions indicative of overfitting. The techniques help prevent the anomaly detection system from becoming a novelty detector that flags any newly observed examples as anomalies. Stated another way, the techniques may enhance the ability of the anomaly detection model to generalize, leading to fewer false flags.

In some embodiments, the anomaly detection system transitions from an unsupervised mode to a supervised mode. As previously mentioned, the supervised mode may be machine-assisted or may be fully supervised. Additionally or alternatively, the anomaly detection system may transition between a machine-assisted supervised mode and a fully supervised mode. The anomaly detection system may thus provide flexibility in how the anomaly detection model is trained, which allows for the results to be tailored to the end user's preferences.

In some embodiments, the transition from an unsupervised mode to a machine-assisted supervised mode includes receiving one or more user-set labels for one or more data points. A user-set label may be any label specified or otherwise provided by a user, which may be a human user or another application separate from the anomaly detection system. For example, a system administrator may start labeling behavior exhibited by one or more computing resources as anomalous. The behavior may have been previously labeled automatically during the unsupervised stage, in which case the user may modify the automatically assigned labels, or may be a new example. In either case, it is possible that the anomaly detection model may not have previously learned the behavior through unsupervised training.

When operating in a machine-assisted supervised mode, the anomaly detection system may upsample the user-set labels by propagating the user-set label to other similar data points. In some embodiments, the anomaly detection system identifies similar data points through cluster analysis. If a cluster has one or more data points with user-set labels, then other data points that are part of the same cluster may also be assigned the same user-set label. In some embodiments, the anomaly detection system may present all or a subset of the upsampled data to the user for inspection before propagating the user-set label and incorporating it into the trained model. If the user accepts the upsampling, then the anomaly detection model may be retrained and/or a new anomaly detection model may be trained.

With fully supervised training, a user-set label is assigned to each data point in the training data. Thus, the anomaly detection system may train a model without using labels that have been automatically assigned or upsampled. The user may transition back to a machine-assisted supervised mode or an unsupervised mode if unsatisfied with the results or if otherwise desired.

Techniques are further described herein for classifying, summarizing, and presenting anomalies in a manner that is more intuitive for end users. The techniques may be used to determine which anomalies should be prioritized for further investigation. One or more responsive actions may be taken, either automatically or with user guidance, to address high-priority anomalies.

In some embodiments, the anomaly detection system is configured for multivariate analysis. To account for multivariate data in complex computing applications, the anomaly detection system may train a model to learn a plurality of anomaly regions within a multidimensional space. Different dimensions in the multidimensional space may correspond to different metrics across one or more computing resources. The anomaly detection system may determine boundaries for the regions based on learned relationships between the different metrics. The anomaly detection system may determine how to classify, summarize, and respond to anomalies as a function of the anomaly region in the multidimensional space where the anomaly is detected.

In some embodiments, the anomaly detection system stores mappings between different respective anomaly regions and respective anomaly classifiers. During the evaluation phase, the anomaly detection system may assign anomaly classifiers to detected anomalies based on the mappings. The anomaly classifiers may be used to identify different types of anomalies and/or root causes for the anomalies. For example, an anomaly region may correspond to different metrics exhibiting different combinations of anomalous high values, anomalous low values, and/or values within an expected range. This information may be useful to determine what is causing the anomaly and what types of responsive actions are most appropriate to address the anomaly.

One or more embodiments described in this Specification and/or recited in the claims may not be included in this General Overview section.

2.0 System Architecture

In some embodiments, systems described herein include software and/or hardware components configured to process time series signals. A time series signal comprises a sequence of values that are captured over time. The source of the time series data and the type of information that is captured may vary from implementation to implementation. For example, a time series may be collected from one or more software and/or hardware resources and capture various performance attributes of the computing resources from which the sample data points were collected. As another example, a time series may be collected using one or more sensors that measure physical properties, such as temperature, pressure, motion, traffic flow, physiological metrics or other attributes of an object or environment.

In some embodiments, systems described herein capture time series signals from multiple entities of an application. An entity in this context may correspond to a software resource, hardware resource, or some other component used in the functioning of an application. In some embodiments, an application follows a multi-tier or multilayered architecture. For example, a three-tier architecture may include a presentation tier for providing a user interface, an application tier for executing the core application logic, and a data tier for managing data access. Each tier may comprise one or more components that are logically and/or physically separated from other tiers. In the three-tier architecture, the presentation tier may comprise one or more web servers, the application tier one or more application servers, and the data tier one or more database servers. However, the number of tiers and the components deployed therein may vary from one implementation to the next.

In some embodiments, multiple time series may be generated for a single entity to track different metrics. As an example, for a given database server, one time series may track the number of active database sessions, a second may track the average query response times, and a third may track the average sequential data read times. As another example, for a given host, a first time series may track the central processing unit (CPU) utilization rate and a second may track the memory utilization rate. The number and types of metrics that are collected for each entity may thus vary from implementation to implementation.

FIG. 1 illustrates example system 100 for automatically detecting, summarizing, and responding to anomalous time series signals in accordance with some embodiments. System 100 generally comprises hosts 110a-n, data collector 120, anomaly management services 130, data repository 140, and clients 150a-k. The components illustrated in FIG. 1 may be implemented in software and/or hardware. Each component may be distributed over multiple applications and/or machines. Multiple components may be combined into one application and/or machine. Operations described with respect to one component may instead be performed by another component.

Components of system 100 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Hosts 110a-n represent a set of one or more network hosts and generally comprise targets 112a-i and agents 114a-j. A "target" in this context refers to an entity or resource that serves as a source of time series data. For example, a target may be a software deployment such as a database server instance, middleware instance, or some other software resource executing on a network host. In addition or alternatively, a target may be a hardware resource, an environmental characteristic, or some other physical resource for which metrics may be measured and tracked.

In some embodiments, targets 112a-i are different entities that are used or otherwise part of an application. For example, targets 112a-i may include load balancers, web servers, software resources, application servers, network hosts, databases, storage servers, and/or other computing resources used to provide an email application, social media application, or some other cloud-based service. The number and types of resources deployed may vary from one application to the next. Further, applications may evolve over time to add, upgrade, migrate, and/or remove resources.

Agents 114a-j comprise hardware and/or software logic for capturing time series measurements from a corresponding target (or set of targets) and sending these metrics to data collector 120. In some embodiments, an agent includes a process, such as a service or daemon, that executes on a corresponding host machine and monitors one or more software and/or hardware resources that have been deployed. In addition or alternatively, an agent may include one or more hardware sensors, such as microelectromechanical (MEMs) accelerometers, thermometers, pressure sensors, heart rate monitors, etc., that capture time series measurements of a physical environment and/or resource. Although only one agent and target is illustrated per host in FIG. 1, the number of agents and/or targets per host may vary from implementation to implementation. Multiple agents may be installed on a given host to monitor different target sources of time series data. In other cases, a single agent may monitor multiple resources locally on the same host or remotely across multiple hosts.

In some cases, agents 114*a-j* may be configured to capture data points at different times and/or sampling rates. For example, one agent may sample CPU performance on a host every ten minutes starting at 11:00 a.m. Another agent may sample active sessions on a database server every five minutes starting at 11:02 a.m. Thus, the sample data points from different entities may not be exactly aligned or sampled at the same interval, which allows for a more flexible and robust system.

In some embodiments, agents 114*a-j* may be configured to capture topology metadata that identifies relationships between different targets. For instance, the topology metadata may identify functional dependencies between different targets. As an example, page requests may be distributed by a load balancer across multiple web servers. A web server may process an incoming page request according to web-based protocols, such as the hypertext transfer protocol (HTTP) and forward application-specific requests to an appropriate application server. An application server may functionally depend on an individual database or a cluster of databases to access and retrieve data used in the execution of application logic. The application server may return results to the web server, to be packaged and served to a requesting client. Topology metadata may capture such information, including metadata that identifies each individual resource that is deployed, the respective type of resource, and the respective functional dependencies of the resource. The topology metadata may comprise a set of nodes representing individual resources and edges connecting the nodes. Edges may identify functional dependencies and/or other relationships between different resources.

Data collector 120 includes logic for aggregating sample data captured by agents 114*a-j* into a set of one or more time series signals or data objects. Data collector 120 may store the time series data in data repository 140 and/or provide the time series data to anomaly management services 130. In one or more embodiments, data collector 120 receives data from agents 114*a-j* over one or more data communication networks, such as the Internet. Example communication protocols that may be used to transport data between the components illustrated within system 100 may include, without limitation, HTTP, simple network management protocol (SNMP), and other communication protocols of the internet protocol (IP) suite.

Data collector 120 may collect or generate timestamps for sample values in a time series. A timestamp for a sample value indicates the date and time at which the sample value was measured or otherwise observed. For example, CPU performance on a target host that is sampled every five minutes may have a sequence of timestamps as follows for the collected samples: August 16, 11:50 p.m., August 16, 11:55 p.m., August 17, 12:00 a.m., and August 17, 12:05 a.m. The sampling rate and manner in which the timestamp is encoded may vary from implementation to implementation.

Anomaly management services 130 provides a functionality or set of functionalities that may be invoked to automatically detect and/or otherwise manage anomalous behavior exhibited by targets resources. Anomaly management services 130 may be executed by one or more of hosts 110*a-n* or by one or more separate hosts, such as a server appliance that is operated independently from the managed hosts. One or more of anomaly management services 130 may be integrated into a network service, such as a software-as-a-service (SaaS), web service, a microservice, or any other cloud service.

Anomaly management services 130 may include, but is not limited to, training analytic 131, evaluation analytic 132, anomaly summarizer 133, response interface 134 and presentation engine 135. Anomaly management services 130 may include one or more additional services and/or may omit one or more of the depicted services depending on the particular implementation. Different management services may implement a function or set of functions for managing anomalous entities in an application, in accordance with some embodiments. However, as previously indicated, the functions described with respect to one component may instead be performed by another component.

Training analytic 131 is configured to train anomaly detection models. Training analytic 131 may operate in an unsupervised mode, whereby training data is labelled automatically, a machine-assisted supervised mode, whereby a portion of the training data is labelled by a user and another portion is labelled automatically based on the user-set labels, or a fully supervised mode, whereby all of labels in the training data are specified by users. Training analytic 131 may transition between one or more modes of operations based on whether the user has provided or would like to provide labels for any of the training data.

Evaluation analytic 132 evaluates incoming data provided by data collector 120 against models trained by training analytic 131 to monitor targets 112*a-j* for anomalous behavior. Evaluation analytic 132 may output a flag or some other indication if anomalous behavior is detected. Additionally or alternatively, evaluation analytic 132 may output a set of data that indicates which sample data points within a given time series are anomalous and/or which sample data points are un-anomalous. An anomalous data point in this context may be a data point that diverges from an expected value or range of values as determined from a trained model. An un-anomalous data point is a data point that has the expected value or falls within the expected range of values per the trained model.

Anomaly summarizer 133 is configured to analyze, categorize, and/or classify anomalies such that the anomalies are easier to process by an end user. For example, anomaly summarizer 133 may generate one or more descriptive labels for each anomaly, such as labels indicative of how severe an anomaly is, how to prioritize detected anomalies, and/or region-based anomaly classifications. Additionally or alternatively, anomaly summarizer 133 may assign scores to anomalies as a function of severity. The labels and/or scores may be used to rank, filter, sort, present, and/or trigger other automated actions. For example, the scores may be used to isolate resources exhibiting the most severe divergence from a baseline and to prioritize responses.

Response interface 134 provides an interface through which automated responsive actions may be triggered. In some embodiments, response interface 134 provides an application programming interface (API) through which one or more responsive actions may be invoked. Response interface 134 may interact with other components of system 100, such as targets 112*a-j*. For example, response interface 134 may provide functionality, such as via an API and communication protocols, through which a resource may be shutdown or restarted. As another example, response interface 134 may provide an interface through which a resource configuration may be modified, such as by installing a patch, adjusting resource settings, or migrating the resource to a different host. One or more responsive actions may be invoked through an interactive interface, such as a graphical user interface (GUI), or automatically based on the generated summaries.

Presentation engine 135 is configured to generate and present interfaces based on the generated summaries. In some embodiments, presentation engine 135 may generate GUI objects for viewing, navigating, and drilling-down on one or more summaries. Presentation engine 135 may automatically filter, sort, and/or otherwise organize the summaries as a function of how the summaries are scored. Additionally or alternatively, presentation engine 135 may provide recommendations and interface objects for invoking actions for resolving anomalies, such as restarting a resource or modifying resource configurations.

In some embodiments, presentation engine 135 includes a frontend interface that allows clients 150*a-k* and/or other system components to invoke anomaly management services 130. Presentation engine 135 may render user interface elements and receive input via user interface elements. Examples of interfaces include a GUI, a command line interface (CLI), a haptic interface, a voice command interface, and an API. Examples of user interface elements include checkboxes, radio buttons, dropdown lists, list boxes, buttons, toggles, text fields, date and time selectors, command lines, sliders, pages, and forms.

Data repository 140 includes volatile and/or non-volatile storage for storing data within system 100. Example data that may be stored may include, without limitation, time series data, trained model components, anomaly summaries, and interface data. Data repository 140 may reside on a different host machine, such as a storage server that is physically separate from other components of system 100 or may be allocated from volatile or non-volatile storage on the same host machine.

Clients 150*a-k* represent one or more clients that may access anomaly management services 130 to generate, view, and navigate summaries. Additionally or alternatively, clients 150*a-k* may invoke responsive actions and/or configure automated triggers via the interfaces described herein. A "client" in this context may be a human user, such as an administrator, a client program, or some other application instance. A client may execute locally on the same host as anomaly management services 130 or may execute on a different machine. If executing on a different machine, the client may communicate with anomaly management services 130 via one or more data communication protocols according to a client-server model, such as by submitting HTTP requests invoking one or more of the services and receiving HTTP responses comprising results generated by one or more of the services.

Additional embodiments and/or examples relating to computer networks are described below in Section 5.0, entitled "Computer Networks and Cloud Networks."

3.0 Model Training Modes and Processes

3.1 Training Process Overview

In some embodiments, training analytic 131 is configured to train one or more anomaly detection models. Training analytic 131 may receive, as input, a collection of data points in an arbitrary dimension. In some embodiments, the data may be multivariate, spanning two or more dimensions. A dimension in this respect may correspond to an individual or combined metric for one or more software and/or hardware resources. For example, a dimension may correspond to active sessions tracked against an individual database or multiple database resources. As another example, a dimension may correspond to average CPU performance on an individual network host or across multiple network hosts. Dimensions may correspond to other time-series signals depending on the particular implementation.

In some embodiments, training analytic 131 outputs a trained anomaly detection model. A trained anomaly detection model in this context refers to a trained machine learning model that may be processed to identify expected behavior across one or more dimensions. The trained model may comprise one or more model component, also referred to as machine-learning artifacts, that are created by the training process. The model components may represent an inferred function for estimating expected values or ranges of values across the one or more dimensions. For example, the model components may be used to estimate an expected range of values for active database sessions, CPU performance, and/or other metrics. Additionally or alternatively, the model components may define a quantile point representing one or more anomaly region boundaries, as explained further below.

Figure 2:
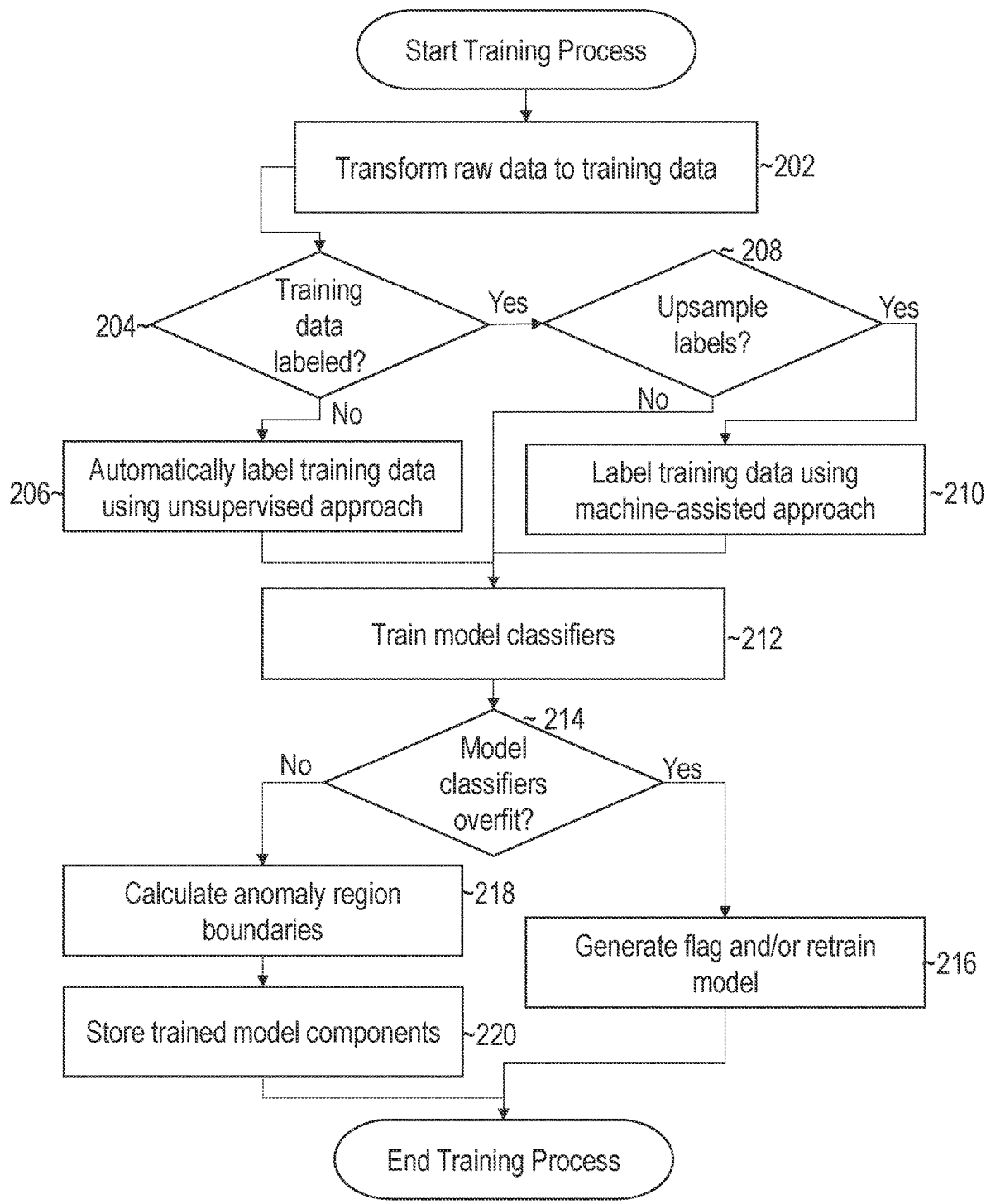
FIG. 2 illustrates an example process for training an anomaly detection model in accordance with some embodiments.

FIG. 2 illustrates an example process for training an anomaly detection model in accordance with some embodiments. One or more operations illustrated in FIG. 2 may be modified, rearranged, or omitted all together. Accordingly, the particular sequence of operations illustrated in FIG. 2 should not be construed as limiting the scope of one or more embodiments.

The process comprises preprocessing the raw data to transform the data to a format suitable for training an anomaly detection model (operation 202). In some embodiments, this operation includes analyzing how many data points are available for training the anomaly detection model. A minimum threshold of data points may be defined for the input data set to help prevent generation of low-quality models. For example, a threshold of 100 data points may be set, although the threshold may vary and/or be configurable by an end user, depending on the particular implementation.

Additionally or alternatively, an upper threshold may be set for the number of data points in the training data set. For example, a threshold of 10,000 data point or any other threshold may be set, depending on the particular implementation. Setting an upper threshold helps to keeps the memory requirements of the training process bound to a reasonable size, allowing for more performant applications. For example, the upper threshold may effectively memory cap the training process to a size that allows for real-time streaming. This allows the training process to be tailored to use cases where near instant response times are expected such as in a software development kit (SDK) or an API that may be called by other processes.

If the number of raw data points exceeds the upper threshold, then the data points may be sampled using a sample size set at the upper threshold. For example, Simple Random Sampling Without Replacement (SRSWOR) may be used to retain 10,000 samples from a raw data set or arbitrary size having more than 10,000 samples. Additionally or alternatively, other sampling techniques may be used to select data points to retain.

In some embodiments, the transformation of raw data to training data includes data normalization. To normalize the data, data points from different dimensions may be organized tabularly, such as into different columns. Thus, each column may represent a different metric or other time series signal of values collected from one or more target resources. The process may divide all values for a dimension by the maximum value of the dimension. The maximum value for the dimension may be determined from the maximum observed value (e.g., the maximum value in the column of raw data) or may be predefined. The result of dividing each value by the maximum value is that the raw data values are converted to values within the range [0,1]. Data normalization facilitates comparison of disparate dimensions having values which may vary significantly.

Once the raw data has been transformed, the training process determines whether any of the training data is labeled (operation 204). In some instances, a user may have labeled a portion or all of the data points. If the training process detects one or more user-set labels, then the process proceeds with supervised training. Otherwise, the anomaly detection model is trained using an unsupervised approach.

In some embodiments, the user may be presented with a prompt at operation 204 to determine whether the user would like to label any of the data points as anomalous or unanomalous. The user may then label, through a GUI or other interface, one or more data points in response to the prompt or may decline to label any data points. In other embodiments, the raw data input may already include user-set labels. Thus, the process for specifying user-set labels may vary from implementation to implementation.

If there are no user-set labels in the data, then the training process automatically labels the training data using an unsupervised approach (operation 206). Techniques for automatically labeling data are described further below in Section 3.2, titled "Biased Sampling and Automatic Labeling."

If a user-set label is detected, then the training process determines whether the label should be upsampled (operation 208). In some embodiments, upsampling and machine-assisted supervised training is triggered when only a portion of the data has been labelled. If all of the data points have been labelled, then upsampling may be skipped and the training process may proceed in the fully supervised mode. In other cases, the training process may prompt a user to determine whether upsampling should proceed. The user may decide to upsample the label, manually label the remaining data points, or revert to automatic labeling via the unsupervised approach.

If it is determined that one or more user-set labels should be upsampled, then the training process proceeds with labeling using a machine-assisted approach (operation 210). Techniques for machine-assisted labeling are described further below in Section 3.3, titled "Machine-Assisted Labeling."

Once all the data points have been labeled through automatic labeling, upsampling, and/or manual labeling, the training process trains model classifiers (operation 212). A model classifier in this context is a model component that is able to classify data as positive (unanomalous) and negative (anomalous).

An example model classifier is a support vector machine. When trained, a support vector machine defines a set of one or more support vectors, also referred to as hyperplanes. The support vectors define boundaries for classifying new examples as anomalous or unanomalous. For example, a support vector may be a line dividing a plane in two parts where examples that fall on one side of the line are classified as anomalous and on the other side as unanomalous. However, support vectors may also be non-linear with more complex boundaries than a line. For instance, support vectors may be formed from a subset of data points from the training data set. Nonlinear approaches to computing support vectors include applying kernel functions, sub-gradient descent, and coordinate descent. SVM classifiers may be computed by minimizing a loss function, such as a hinge loss function. In addition or as an alternative to SVMs, other model classifiers may be trained depending on the particular implementation. Examples may include artificial neural network classifiers and random forest classifiers.

In some embodiments, the training process determines whether the model is overfit (operation 214). Where an SVM classifier is trained, this operation may comprise validating whether the percentage of positive-class support vectors is less than a threshold value. For example, if the percentage of training data used to form the positive-class support vectors exceeds a threshold value of 50%, then the training process may determine that the model is overfit. Other threshold values may also be used and/or configurable by an end user, depending on the particular implementation.

If the model is overfit, then the training process generates a flag to notify the end user and/or retrains the model (operation 216). If the support vectors include too many data points, then it is indicative that the trained model is not able to generalize well, raising the likelihood of false positives. The model may attempt to wait for more training data, using a different training data set, and/or use different training techniques to retrain and obtain a higher-quality model.

If the model is not overfit, then the training process calculates anomaly region boundaries (operation 218). In some embodiments, the anomaly boundary regions are determined as a threshold percentile per dimension over the set of positive-class support vectors. As previously indicated, the positive-class support vectors are formed from a subset of the training data. A default threshold of $95^{th}$ percentile may be used. However, this value may vary and/or be configurable by an end user, depending on the particular implementation.

In some embodiments, the anomaly boundary region may be defined as a point representing the corner of a hyper-rectangle. With a threshold quantile of $95^{th}$ percentile, the corner is for a hype-rectangle which contains most of the training data. The quantile point in turn generates a partition of the space into quadrants, which are regions that may be used as an additional classification during the evaluation stage.

Once trained, the training process stores the model components, including the trained classifiers and learned anomaly boundary regions, in volatile and/or non-volatile storage (operation 220). The stored components may be used to make predictions and detect anomalies as described in further detail in Section 4.0, titled "Anomaly Detection and Classification."

3.2 Biased Sampling and Automatic Labeling

In some embodiments, the unsupervised training process involves biased sampling of the normalized data. Biased sampling allows the anomaly detection model to learn over all of the data and not just the areas where populations are highly concentrated. As a result, false flagging of behavior that is less frequent but unanomalous may be mitigated.

Figure 3:
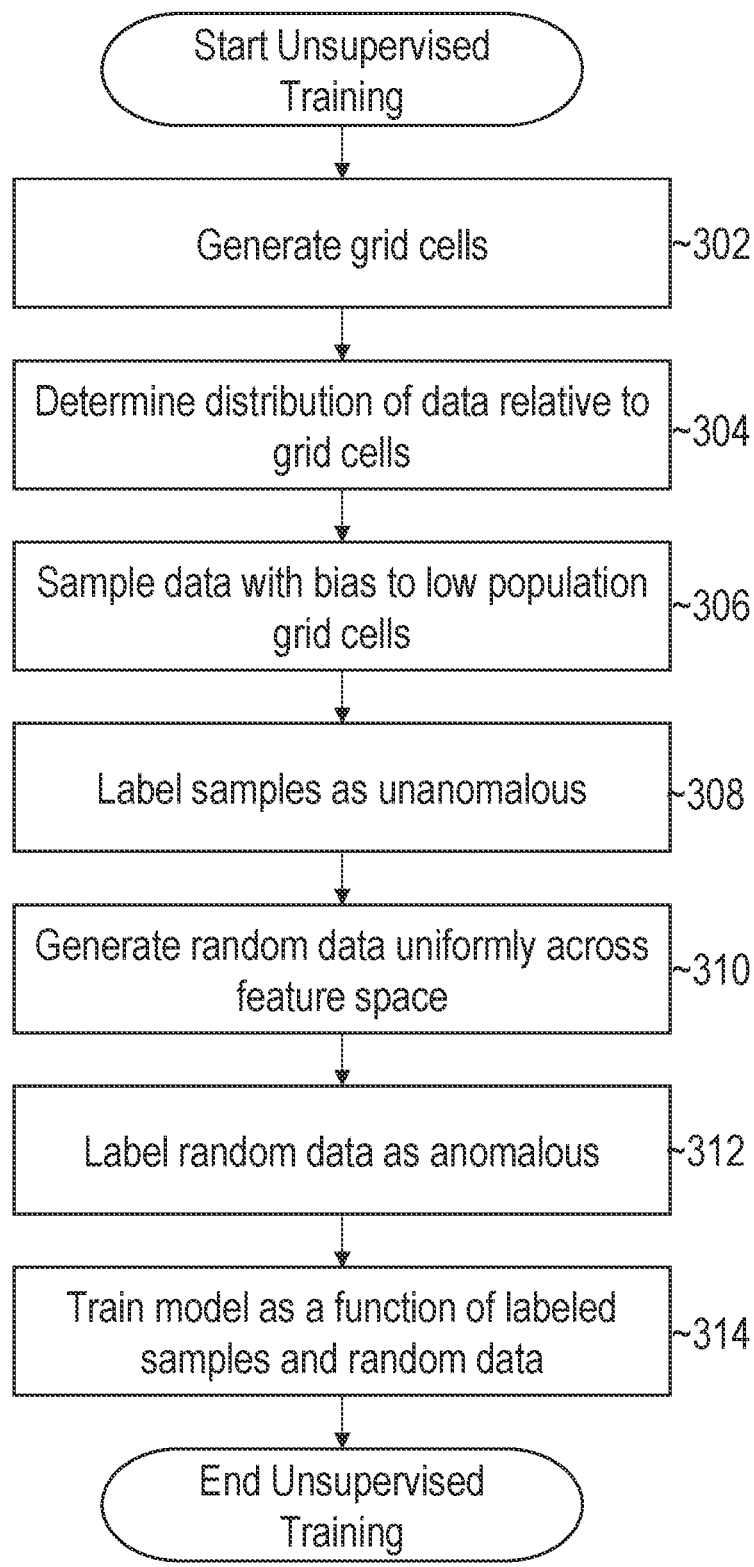
FIG. 3 illustrates an example process for biased sampling and unsupervised labelling of data in accordance with some embodiments.

FIG. 3 illustrates an example process for biased sampling and unsupervised labelling of data in accordance with some embodiments. One or more operations illustrated in FIG. 3 may be modified, rearranged, or omitted all together. Accordingly, the particular sequence of operations illustrated in FIG. 3 should not be construed as limiting the scope of one or more embodiments.

In some embodiments, to accommodate biased sampling, the training process generates a set of grid cells (operation 302). With multivariate data, various dimensions may define a hyper-rectangle that contain the data points. The grid cells may be formed by splitting the hyper-rectangle where each dimension is split into k sections, with k representing an integer greater than two. In the examples provided herein, a default value of five was used; however, other implementations may use other default values. The grid cells may be the same size by evenly splitting the hyper-rectangle or may vary in size based on weights or other criteria.

The training process next determines the distribution of data relative to the grid cells (operation 304). In some embodiments, the data points are stored in a balanced tree, such as a k-dimensional tree. The training process may query the balanced tree for which data points belong to each grid cell. Each grid cell may be labeled with integers that are used to identify the membership of each data point. The result is a set of clusters, where each cluster is being represented by a grid cell of zero or more data points from the training data.

Once the distribution of data points has been determined, the training process samples data with a bias to low population grid cells (operation 306). In some embodiments, the sample size for a grid cell may be computed as follows:

$$s = \frac{c}{\log c}$$

where s represents the sample size for the grid cell and c is a value representing the cell size (e.g., the number of data points assigned to the grid cell at operation 304). In cases where there are no data points resulting in a numerical error, the value of s may be set to zero. In the present example, the value c is divided by its logarithm based 10 to bias sampling to lower population cells. However, other functions and techniques may also be used to bias sampling, depending on the particular implementation. The training process may perform SRSWOR within each grid cell using the computed sample size to retain a set of s biased sample values.

In some embodiments, the training process labels the biased samples as unanomalous while operating in the unsupervised mode (operation 308). The unanomalous label may be represented as "+1" corresponding to a positive class within the training data.

The training process further generates random data uniformly across the feature space (operation 310). The random data points act as an artificial second class of data, distinct from the first class of data assigned unanomalous labels. Stated another way, the first class of data is formed based on observed examples in the training data. The second class of data is formed from the uniformly distributed random data. The distinct classes and corresponding labels facilitate a seamless transition from the unsupervised mode to a supervised mode.

In some embodiments, the training process labels the random data as anomalous (operation 312). The anomalous label may be represented as "−1" corresponding to a negative class within the training data. During the transition process, the observed and random data samples may be differentiated based on the label.

The training process then trains the anomaly detection model as a function of the labeled samples from the training data and the random data (operation 314). Training the model may include training the model classifiers, such as a support vector machine, and learning the anomaly boundary regions as previously described.

Figure 4:
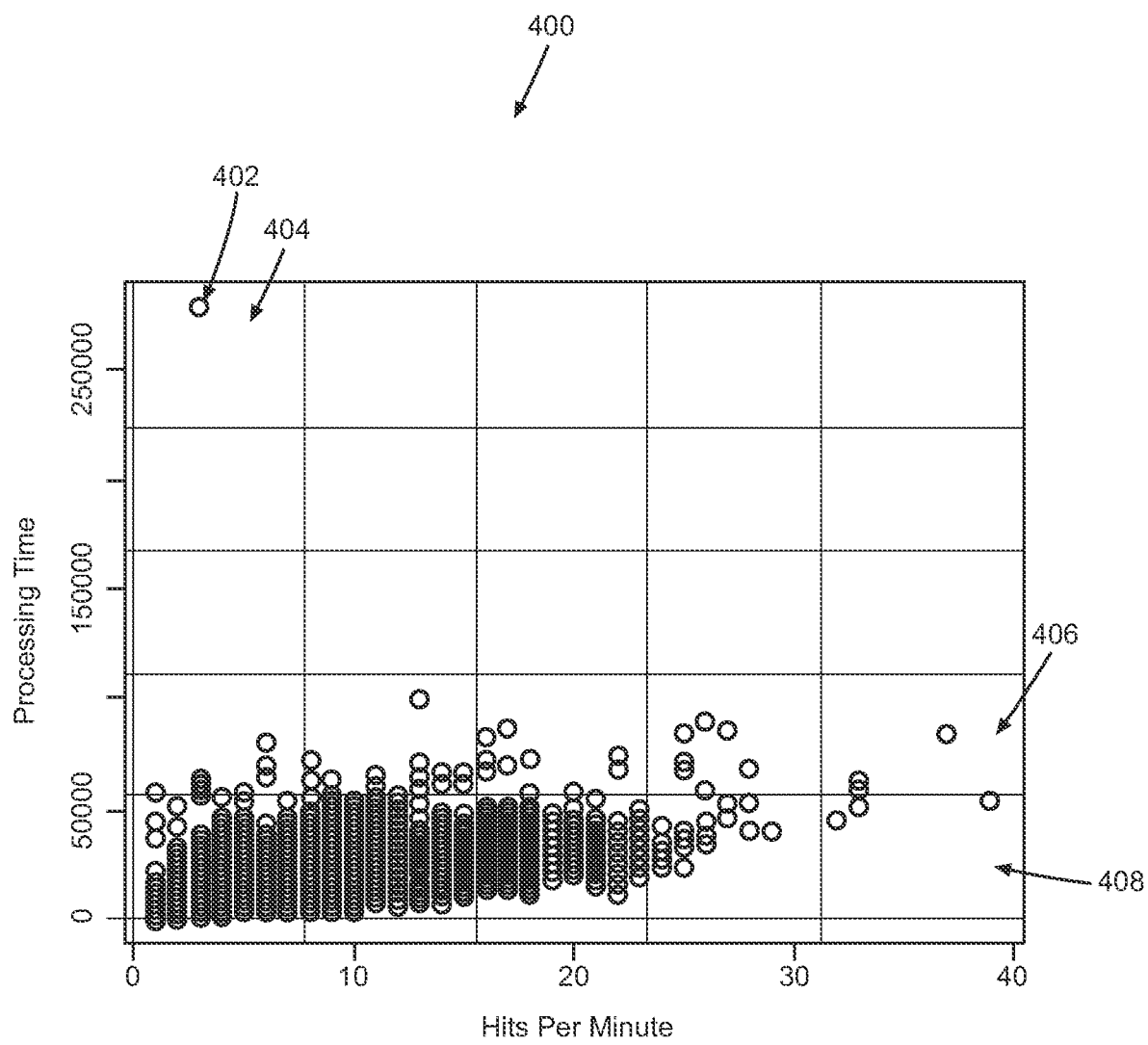
FIG. 4 illustrates an example set of grid cells for performing clustering and biased sampling in accordance with some embodiments.

FIG. 4 illustrates an example set of grid cells for performing clustering and biased sampling in accordance with some embodiments. In the illustrated example, chart 400 provides an example visualization of sample data points spanning two dimensions: hits per minute for a web resource and processing time for a network host. With a k value of five for each dimension, the hyper-rectangle containing all the data points is split into 25 grid cells. Each grid cell includes zero or more data points with sampling biased toward low population grid cells. For example, sampling may be biased for grid cell 404, which includes data point 402, and grid cells 406 and 408. Each of these grid cells is much lower populated than grid cells in the lower left regions of the hyper-rectangle. The data points in the hyper-rectangle may be labeled "+1", which associates the observed biased samples with the positive class of data.

In some embodiments, several random data points may be added to the hyper-rectangle and grid cells depicted in chart 400. The random data may be labeled "4", which associates the random values with the negative class of data. The model may then be trained as a function of which data points are associated with the positive class (the biased/observed samples) and which data points are associated with the negative class (the random data). For example, an SVM may be trained to minimize a hinge loss function as previously indicated.

3.3 Machine-Assisted Labeling

If a user has labeled anomalies that fit a certain criteria, then the user may want to label other similar anomalies in a similar manner. However, the user may not have the bandwidth to label each similar example in a timely manner. When operating in a machine-assisted supervised mode, the training process may assist the user in propagating user-set labels to other similar data points without requiring a manual review for each labeled data point.

Figure 5:
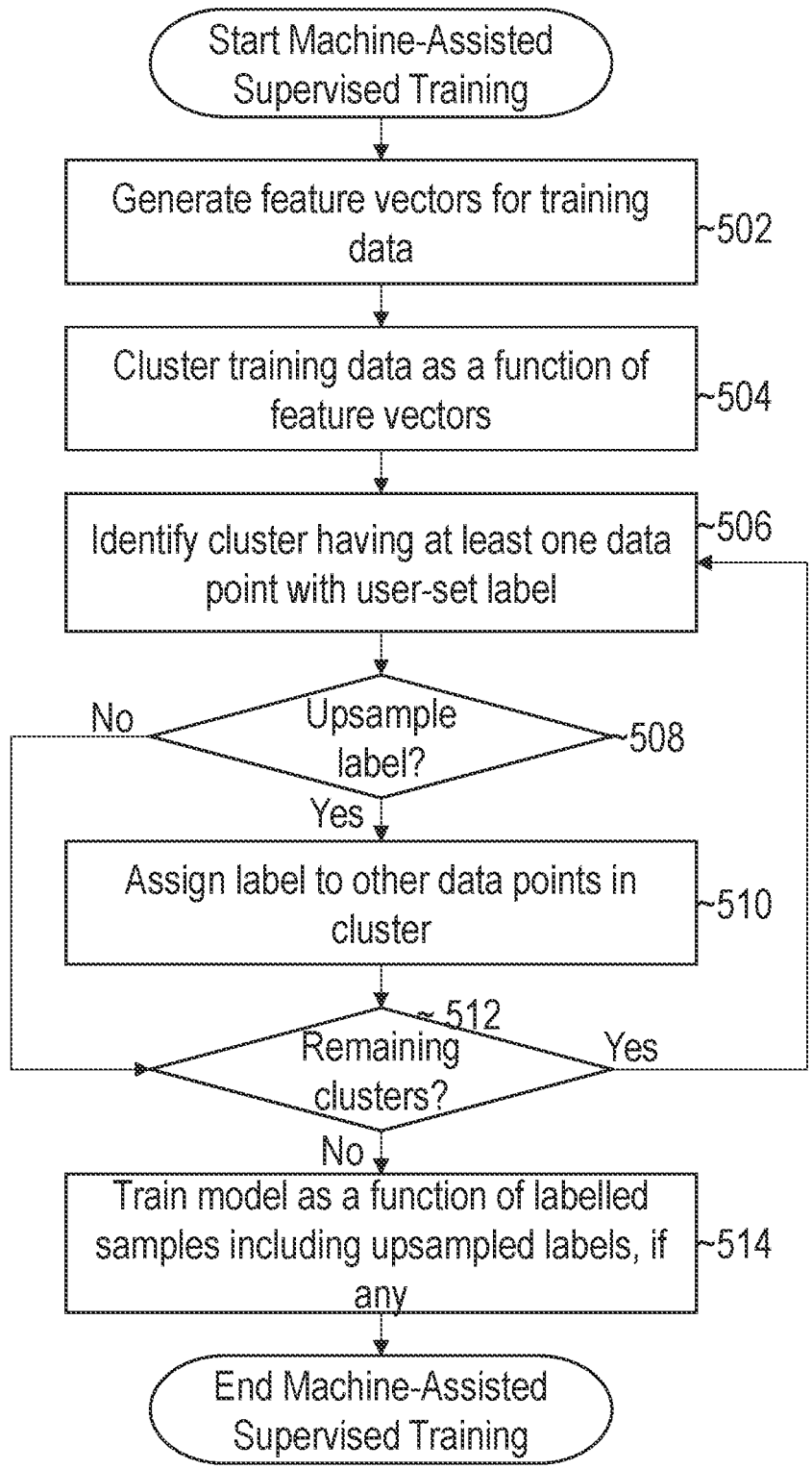
FIG. 5 illustrates an example process for machine-assisted supervised training of an anomaly detection model in accordance with some embodiments.

FIG. 5 illustrates an example process for machine-assisted supervised training of an anomaly detection model in accordance with some embodiments. One or more operations illustrated in FIG. 5 may be modified, rearranged, or omitted all together. Accordingly, the particular sequence of operations illustrated in FIG. 5 should not be construed as limiting the scope of one or more embodiments.

In the machine-assisted supervised mode, the training process generates a set of feature vectors for data points labeled as anomalous (operation 502). The training process may form the feature vectors by fetching and extracting values for features used to determine similarity. Example features may include, but are not limited to:

entity type indicating the type of software or hardware resource on which the anomalous behavior occurred (e.g., database host, middleware, load balancer, web server, etc.);

metric identifier indicating what metric was exhibiting the anomalous behavior (e.g., active sessions, memory performance, CPU utilization, page hits per minute, I/O throughput, etc.);

lifecycle type (e.g., archival, test, production, etc.); and/or time (e.g., hour of day, day of the week), when the anomaly occurred.

Additionally or alternatively, feature vectors may be formed from other attributes and/or combinations of attributes. In some embodiments, the training process may prompt a user to select feature attributes. The user may add, delete, or otherwise modify a list of features used to find similar anomalies within the training data.

The training process next clusters the training data as a function of the feature vectors (operation 504). In some embodiments, the training data is clustered using Gower's Coefficient of Similarity and Hierarchical Clustering. A cutoff value of 0.5 may be set to enforce tighter clusters. However, the cutoff may vary depending on the particular implementation. Further, other clustering techniques may be used to group data points based on similarity between the feature vectors. Examples include, but are not limited to, k-means clustering and spectral clustering.

Once the clusters have been formed, the training process identifies a cluster having at least one data point with a user-set label (operation 506). For example, the training process may identify a cluster having a data point explicitly labeled as anomalous or unanomalous by the user. Automatically-assigned labels, if any, may be ignored during this operation. A given cluster may have data points that have user-set labels, automatically-assigned labels, and/or unlabeled data points.

In some embodiments, the clusters are formed such that different user-set labels are assigned to different clusters. For example, the training process may prevent a data point labelled as unanomalous from being assigned to the same cluster as a data point labeled anomalous by the user. However, a data point labeled (e.g., anomalous) by the user may be assigned to the same cluster as a data point automatically assigned a different label (e.g., unanomalous). Further, data points with the same user-set labels may be placed in the same cluster or in different clusters, depending on the similarity of the feature vectors.

The training process next determines whether to upsample the at least one label in the cluster (operation 508). In some embodiments, the training process may propagate the label to one or more other data points in the cluster. To propagate the label, unlabeled data points and/or automatically labeled data points, if any, are assigned the same user-set label. An automatically-assigned label may be replaced with the user-set label in some embodiments. For example, the training process may have automatically assigned a label of "+1" to a data point during unsupervised training. If the data point is assigned to the same cluster as a data point with a user-set label of "4", then the automatically-assigned label may be modified to match the user-set label. That is, the automatically assigned label of "+1" is replaced with the label "−1".

In some embodiments, the training process may only upsample user-set labels for clusters that satisfy a set of criteria. For example, the training process may upsample a user-set label for a cluster only if a minimum threshold of labeled points in the cluster have been assigned the user-set label. The threshold may be a fixed value or may vary depending on how many samples are in a cluster. If a cluster is small, then the threshold percentage of labeled points in the cluster may be higher to reduce the likelihood that the user-set label is propagated to relatively dissimilar data points. If the cluster is large, then the threshold percentage of labeled points may be lower as the risk that the data points are dissimilar is decreased. For instance, a cluster with 5000 samples may have a threshold of 100 user-set labels, but a cluster of 10 samples may have a threshold of 5 user-set labels before the patterns is learned. The thresholds and/or criteria for upsampling a label may vary depending on the particular implementation.

In some embodiments, the training process prompts a user to confirm whether the user-set label should be upsampled to other data points in the cluster. In some embodiments, the training process may present a subset of the data points in the cluster to the user for review. The subset may be randomly selected or selected based on similarity and/or other criteria, depending on the particular implementation. If the user is dissatisfied with the results, the user may recluster the data points along different features, manually label the data points, or revert back to unsupervised training.

The training process next determines whether there are any remaining clusters to analyze (operation 510). If so, the process returns to operation 506 and repeats for the next cluster with a user-set label.

Once upsampling is complete, the training process trains the anomaly detection model as a function of labeled samples including the upsampled labels, if any (operation 512). Training the model may include training the model classifiers, such as a support vector machine, and learning the anomaly boundary regions as previously described.

3.4 Fully Supervised Training

In some embodiments, the user may want to manually label all of the training data rather than rely on the unsupervised or semi-supervised approaches. For example, the user may be unsatisfied with the predictions of a model trained by the other approaches or may otherwise worry about the precision of the model. In these scenarios, the user may assign and/or modify the labels for each individual data point in a fully supervised training mode.

In some embodiments, the training process may suggest labels to assign to training data. For example, the training process may recommend labels based on the similarity of feature vectors, similar to the upsampling process previously described. The fully supervised process may allow the user to review and validate the recommendation against each individual data point in the training data rather than automatically propagating the label other data points in a cluster.

In some embodiments, the recommended labels may be updated in real-time as a user is specifying labels. For example, if a user specifies a different label then what is recommended, the training process may generate a new cluster (or set of clusters) to groups data points similar to the one the user just labeled. As the user is reviewing other data points assigned to the new cluster, the training process may recommend the same user-set label. If the user again specifies a different label then what is recommend, the process may again re-cluster to account for the user feedback in an attempt to incorporate the newly learned patterns and facilitate the labeling process.

Once a user has labeled or validated the labels assigned to each data point, the training process may then train the anomaly detection model as previously described.

3.5 Transitions Between Unsupervised and Supervised Training

As previously mentioned, the training process may transition between supervised, machine-assisted supervised, and/or fully supervised training. In some embodiments, the training process may begin operating in an unsupervised mode to allow for anomaly detection services to come online with little to no downtime. The user may then refine anomaly detection the model by providing labeled examples, which may be upsampled according to the machine assisted approach. To further refine the model, the user may continue to label examples in the machine-assisted supervised mode or the fully supervised mode. If a state change, such as an application patch or other event, affects the precision of a model trained through the supervised approach, then the user may revert back to unsupervised mode before updating the labels.

Figure 6:
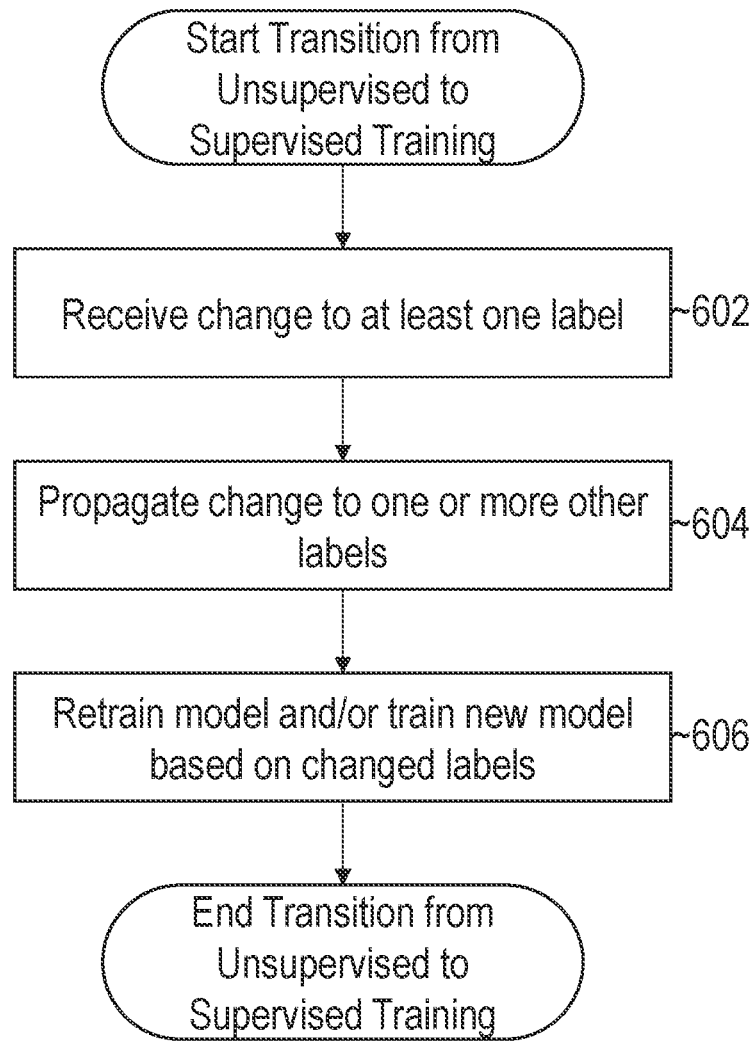
FIG. 6 illustrates an example process for transitioning between unsupervised and supervised training in accordance with some embodiments.

FIG. 6 illustrates an example process for transitioning between unsupervised and supervised training in accordance with some embodiments. One or more operations illustrated in FIG. 6 may be modified, rearranged, or omitted all together. Accordingly, the particular sequence of operations illustrated in FIG. 6 should not be construed as limiting the scope of one or more embodiments.

The transition process includes receiving a user-set label (operation 602). In some embodiments, the user-set label may modify an automatically-assigned label. For example, a user may modify a label from "+1" to "−1" to move the data point from the positive class to the anomalous class. In other cases, the user-set label may for a new example that was not previously labeled when operating in the unsupervised training mode.

Responsive to receiving the user-set label, the process transitions from unsupervised mode to a supervised mode by propagating the user-set label to other similar data points and/or prompting the user for to label more training data (operation 604). In some embodiments, the user may explicitly specify through a user interface whether to transition to the machine-assisted supervised or fully supervised mode. In other embodiments, the process may infer the transition based on whether the user would like to upsample any of the user-set labels. If so, then the process may transition to machine-assisted supervised training. Otherwise, the process may guide the user through fully supervised training such as previously described.

After the transition, the training process retrains the anomaly detection model and/or trains a new anomaly detection model based on the updated labels (operation 606). For example, the training process may retrain the SVM to learn a new set of support vectors and/or may learn a new set of boundary regions as a function of the updated labels.

The examples provided above involved transitioning from the unsupervised to a supervised approach. In other embodiments, the training process may begin operating in a semi-supervised or fully supervised mode using a set of user-labeled training data. The user may delete or modify the user-set labels to trigger changes to the trained model and corresponding predictions. If the user deletes all the user-set labels, then the process may transition to the unsupervised approach as previously described. Thus, the user is provided with flexibility to transition between different training modes over time.

4.0 Anomaly Detection and Classification

4.1 Evaluation Process Overview

Once trained, an anomaly detection model may be used to make predictions against new data to monitor for anomalies.

In some embodiments, evaluation analytic 132 receives, as input, a set of test data to evaluate. The test data may be provided by a user, an external service (e.g., a microservice application or some other cloud service), or automatically collected (e.g., by data collector 120). In response, evaluation analytic 132 compares the test data to a set of predictions generated as a function of the trained model components. The predictions may define an expected range of values for the set of test data. If an anomaly is detected, evaluation analytic 132 may output a flag and/or information about the anomaly.

Figure 7:
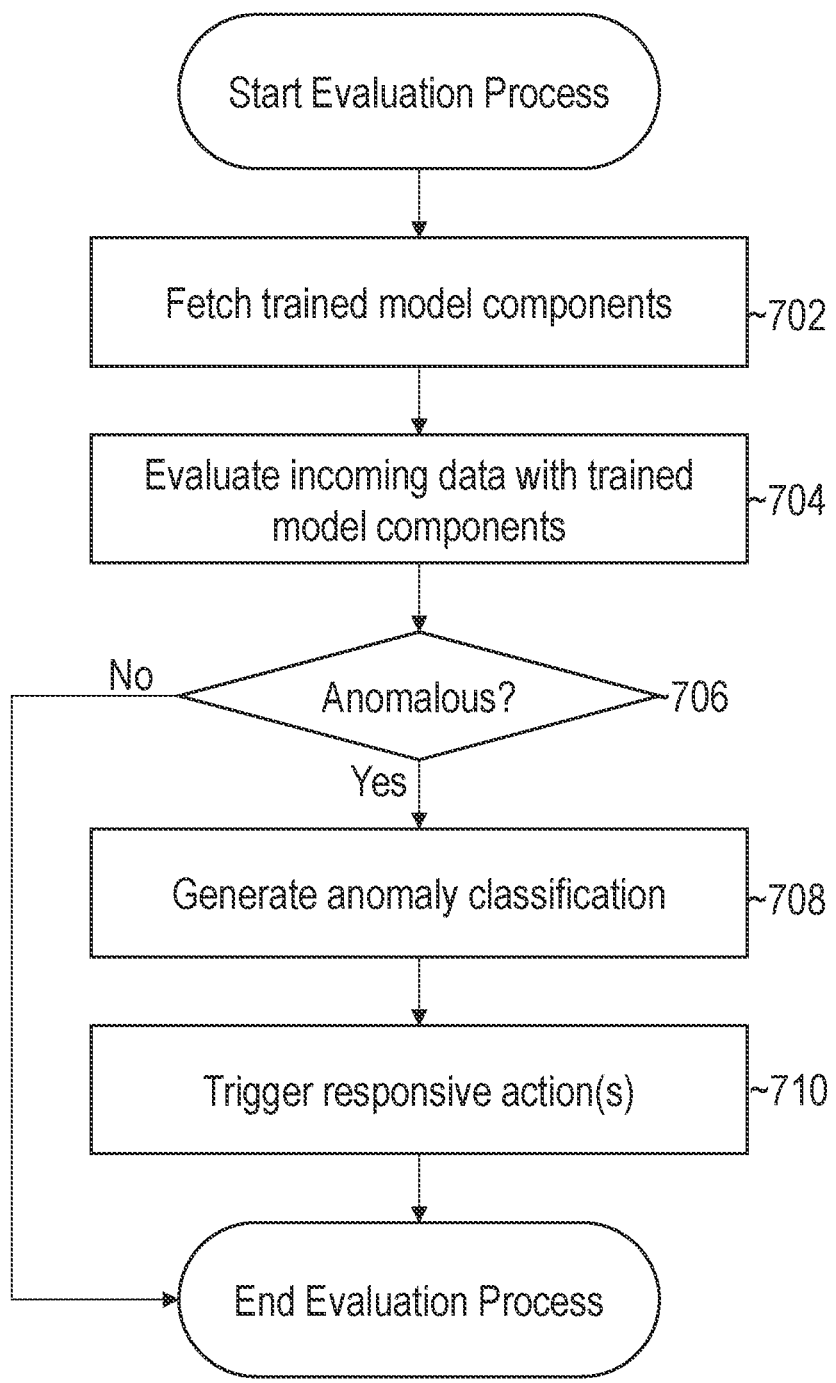
FIG. 7 illustrates an example process for evaluating incoming data with a trained anomaly detection in accordance with some embodiments.

FIG. 7 illustrates an example process for evaluating incoming data with a trained anomaly detection in accordance with some embodiments. One or more operations illustrated in FIG. 7 may be modified, rearranged, or omitted all together. Accordingly, the particular sequence of operations illustrated in FIG. 7 should not be construed as limiting the scope of one or more embodiments.

The evaluation process fetches trained model components (operation 702). The trained model components may include, but are not limited to, the trained classifiers, such as the support vectors, and the learned anomaly boundary regions. As previously mentioned, the support vectors may include a series of points formed from a subset of the training data. A learned anomaly boundary region may be stored as a point representative of the corner of a hyper-rectangle.

The evaluation process next evaluates incoming data with the trained model components (operation 704). For example, the evaluation process may use the trained classifiers to map incoming data points to a positive class or a negative class. Further, the evaluation process may determine the anomaly boundary region(s) where the incoming data points fall. The anomaly boundary regions may provide useful information about the causes and symptoms of anomalous behavior, as described further below.

Based on the evaluation, the process determines whether the incoming data is exhibiting anomalous behavior (operation 706). The trained classifiers may account for multiple variables in the incoming data. For example, the incoming data may include metrics for processing time and hits per minute for a web application. The trained support vector machine may classify a relatively high processing time as unanomalous if the hits per minute is also relatively high. However, the same value for processing time may be classified as anomalous if the hits per minute is relatively low. The evaluation process may make the determination without analyzing correlation coefficients or other correlation information between different variables. Rather, the support vectors may be learned per the techniques previously described.

In some embodiments, the evaluation process may further account for one or more features of the incoming data during the evaluation process. For example, the evaluation process may form feature vectors for the incoming data similar to the machine-assisted supervised training process described above. The classification for a given value or series of values may depend on one or more of the entity type, metric identifier, lifecycle status, and/or time of day. For instance, a relatively high number of active sessions on a database host may be unanomalous at one time of day but anomalous at another time of day or on an archival database.

If an anomaly is detected, then the evaluation process generates one or more anomaly classifications or summaries (operation 708). An anomaly classification or summary may comprise information about a detected anomaly. Example information may include, but is not limited to, a probability that the incoming data is exhibiting anomalous behavior, how severe the anomaly is, what metrics are exhibiting anomalous behavior, what is a likely cause of the anomalous behavior, similar anomalies that were previously detected, and/or remedial actions that were taken for similar anomalies. As described further below, mappings may be stored to link attributes associated with a detected anomaly to corresponding classifiers, labels or summaries for the anomalies.

In some embodiments, the evaluation process triggers one or more responsive actions responsive to detecting an anomaly (operation 710). For example, if a resource is exhibiting anomalous behavior, the evaluation process invoke one or more APIs via response interface 133 to restart the resource, migrate the resource, bring additional resources online, or otherwise configure resources to mitigate the impact of the resource on the performance of a multitier application. For instance, if a database (or any other resource) is exhibiting anomalous behavior, a backup resource may be brought online and requests may be redirected to the backup resource until the issue is resolved. Additionally or alternatively, the affected database may be restart and/or a patch may be applied in an attempt to resolve any issues.

Additionally or alternatively, the one or more responsive actions may include sending an alert to an end user. The alert may be sent via email, short message service, social media, and/or other communication channels, which may be configurable by the end user. Alerts may be restricted to anomalies meeting certain criteria, such as a threshold priority level, to avoid inundating the end user with too many messages.

Additionally or alternatively, the one or more responsive actions may include generating and presenting an interactive interface to the user, such as a webpage or SaaS interface. In some embodiments, the interactive interface includes a list of detected anomalies, if any. The list may be sorted and/or filtered based on the anomaly classifiers. For example, the interactive interface may present the top n most critical anomalies detected.

In some embodiments, the interactive interface allows a user to drill-down and view information about specific anomalies. For example, the user may click on an anomaly from a list to view any of the summary and classification information described herein. Additionally or alternatively, the interface may present visualizations, such as the example multidimensional charts described herein. The drill-down information may facilitate a quick diagnosis of the root cause of the anomaly.

In some embodiments, the interface allows a user to trigger actions to address anomalies. For example, a user may select, via the interface, an anomaly that pertains to metrics of a particular web server. In response, the interface may present the user with available or recommended actions to address the anomaly. For instance, the interface may allow the user to patch the web server, migrate to a different web server, and/or perform any of the other actions previously described. The user may then click on or otherwise select one of the actions to initiate its execution. Other interfaces and/or responsive actions may also be triggered depending on the particular implementation.

4.2 Probabilistic Prediction-Based Anomaly Classification

In some embodiments, the evaluation process labels anomalies as a function of the probability that the test data is anomalous. The labels may be used to sort, filter, and/or prioritize anomalies. Further the labels may be used to trigger automated actions, as described further herein.

In some embodiments, system 100 stores a mapping of anomaly labels and associated probabilities. An example map is provided as follows:

TABLE 1

ANOMALY LABEL MAPPINGS

| Anomaly Label | Anomaly Probability |
|---|---|
| CRITICAL | 0.99 |
| WARNING | 0.97 |
| FINDING | 0.95 |

In the example mapping, a 99% or greater probability is labeled as CRITICAL, probabilities of 97% or greater but less than 99% are labeled WARNING, and probabilities of 95% or greater but less than 97% are labeled FINDING. Additional or fewer labels may be defined, depending on the particular implementation. Further the thresholds associated with each label may vary depending on the particular implementation.

In some embodiments, the user provides a mapping of the anomaly labels and the associated probabilities. For example, the user may input the name of the anomaly and the lower cutoff threshold for assigning the anomaly label. The mapping may be stored and used subsequently by the evaluation process. If no mapping is provided, then the evaluation process may use a default mapping or proceed without assigning an anomaly label as a function of probability.

In some embodiments, multiple mappings are stored where the thresholds and/or labels vary depending on other factors. For example, different mappings may be defined for different anomaly regions. The lower cutoff for the CRITICAL label in one region may be 95% whereas is may be 99% for another region. Also, other labels may be assigned such as CRITICAL: DATABASE OVERLOADED for one region and CRITICAL: DATABASE UNRESPONSIVE.

In some embodiments, the output of the evaluation stage includes a labeling of the test data using anomaly labels from the map. The points in the data are assigned labels which correspond to the maximum matched probability from the prediction generated as a function of the trained classifier. For example, each data point identified as anomalous within the test data may be assigned a label of CRITICAL, WARNING, or FINDING depending on the prediction probability and corresponding mapping.

The responsive actions that are taken for a given anomaly may vary depending on the anomaly label assigned. For example, an anomaly assigned a CRITICAL label may be automatically brought offline whereas an anomaly with a WARNING label may be allowed to operate pending further review by an administrator. The actions that are triggered for a given label may vary from one implementation to the next and may be configurable by an end user.

4.3 Region-Based Anomaly Classification

In some embodiments, anomaly are classified as a function of the anomaly region in which they are located. As previously mentioned, the training process may compute a quantile point whose coordinates are a certain quantile (e.g., 95%), of the positive-class support vectors coordinates. For example, the second coordinate of the point may represent the 95% quantile among all values of the second coordinates of the positive-class support vectors. The point induces a partition of the space into orthogonal sections, which may be referred to as quadrants.

In some embodiments, quadrant regions are labeled with integers from 0 to $2^{dim}-1$, where dim is the dimension of both the training and the test data. To perform quadrant classification, the evaluation process may perform the following for each test point:

Create a bit vector of length dim (dimension of data). The bits in the binary representation may match the point's dimension in reverse order. That is the point's coordinates may be organized from left to right while bits in the bit vector array may be organized from right to left. This allows the bit vector to pick up the lower end of the range.

For each coordinate of the quantile point, compare the coordinate against the test vector. If a particular test coordinate is greater than the corresponding coordinate in the quantile point, then a corresponding bit in the bit vector may be set to one. Otherwise the bit may be set to zero.

Once all coordinates of the test point have been compared, the bit-vector is encoded as an integer and its value is assigned as the quadrant label.

A quadrant label for a given test point identifies which anomaly region in multidimensional space where the test point is located. It is noted that the anomaly region boundaries, represented by the quantile point, are different than the support vectors, which may also be thought of as boundaries. In some cases, one test point in an anomaly region may be anomalous whereas another test point in the same region may be unanomalous. Therefore, a given quadrant may not be determinative of whether a test point is anomalous. However, the quadrants may facilitate root cause analysis.

In some embodiments, mappings may be stored between quadrant labels and anomaly labels For example, mappings such as "Load and response within observed range", "Load within observed range, response outside observed range", "Load outside observed range, response within observed range" and "Load and response outside observed range" may be mapped to different anomaly regions in a two-dimensional space. The labels may become more complex the greater the number of dimensions. The mappings and labels may vary from implementation to implementation. Further, the mappings and labels may be exposed to and configurable by an end user.

Figure 8:
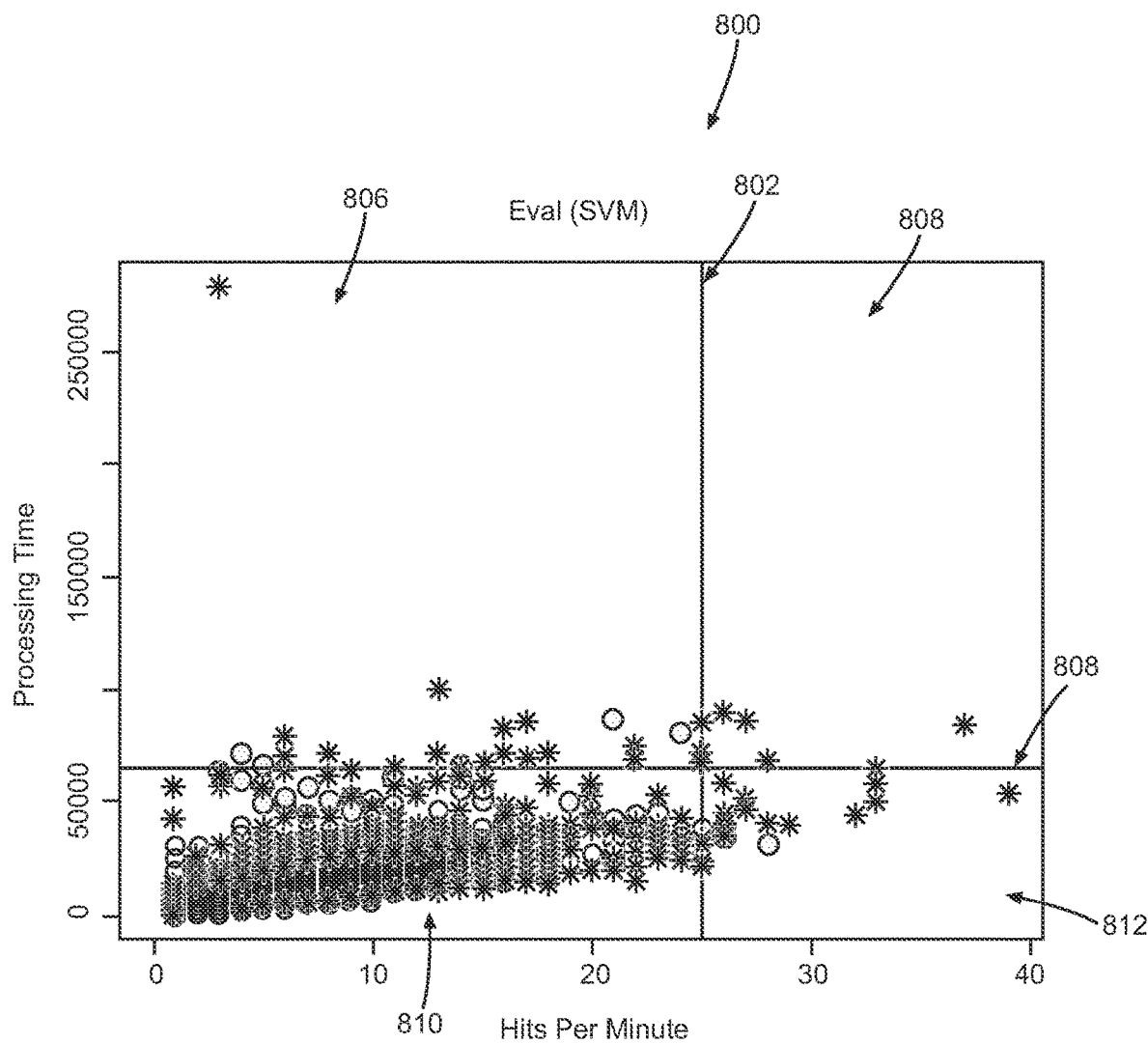
FIG. 8 illustrates an example set of learned boundaries used to classify anomalous behavior in accordance with some embodiments.

FIG. 8 illustrates an example set of learned boundaries used to classify anomalous behavior in accordance with some embodiments. Plot 800 depicts an example result of the evaluation stage. In some embodiments, plot 800 may display data points in different colors (not shown) depending on whether the data point is anomalous, part of a support vector, or unanomalous. For example, blue points may represent support vectors from the training data, black points may be unanomalous data points from the test data, yellow data points may represent anomalous data points classified as FINDING, orange data points may represent anomalous data points classified as WARNING, and red data points may represent anomalies classified as CRITICAL. Additionally or alternatively, the data points may be displayed using different patterns. For example, a star pattern may represent support vectors from the training data, solid dots may represent unanomalous data points from the test data, and hollow dots may represent anomalous data points. The manner in which the data points are displayed, including the color coding, if any, may vary depending on the particular implementation.

As can bee seen in plot 800, boundaries 802 and 804 split the hyper-rectangle into four quadrants (i.e., quadrant 806, 808, 810, and 812). The intersection of boundaries 802 and 804 is the quantile point, which may be computed based on the support vectors as previously described. Anomalies located in quadrant 806 have load within the expected range and response outside the observed range. In quadrant 808, anomalies have load and response times outside the observed range. In quadrant 810, anomalies have load outside the observed range and response times within the observed range. In quadrant 812, anomalies have load and response times both within the observed range.

Figure 9:
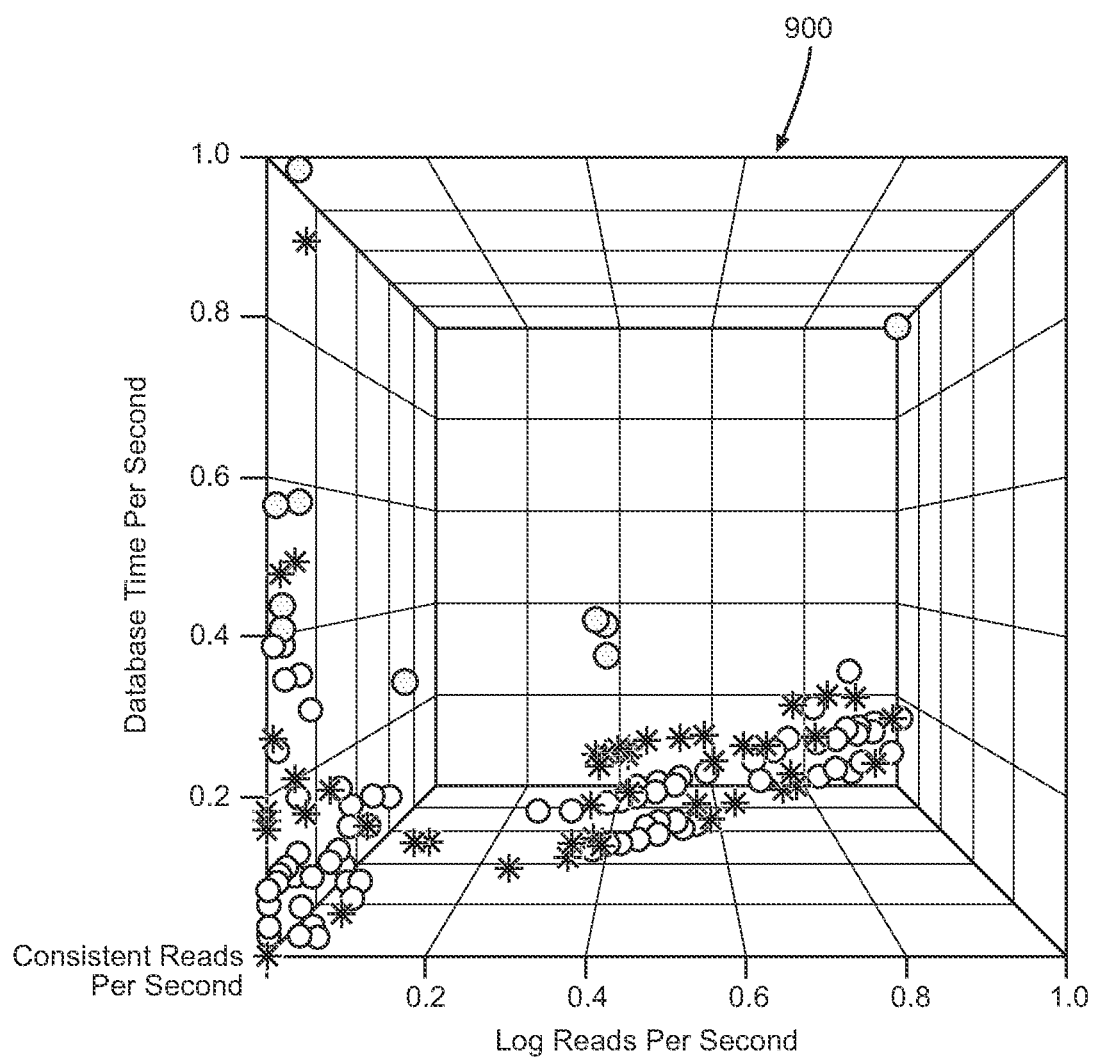
FIG. 9 illustrates data points of an anomaly detection model in a three-dimensional space in accordance with some embodiments.

The previous plots involved anomaly detection in a two-dimensional space. However, as previously mentioned, models may be trained and evaluated over any number of dimensions. For example, FIG. 9 illustrates data points of an anomaly detection model in a three-dimensional space in accordance with some embodiments. As can be seen in plot 900, the X-Y plane refers to consistent reads and log reads per second on a database. The Z axis represents the database time per second metric, which is indicative of the overall database performance. A quantile point in this space may split the multidimensional space into eight separate quadrants. Corresponding labels may be assigned to each region as previously described.

The responsive actions that are taken for a given anomaly may vary depending on the quadrant label assigned and associated mapping. For example, the response to an anomaly classified as ""Load and response outside observed range" may be different than "Load within observed range and response outside observed range". The different labels are indicative of differing root causes for the anomalies. Therefore, the corrective action that is taken may vary based, in part, on the region where an anomaly falls.

5.0 Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as HTTP. The requests are communicated through an interface, such as a client interface (such as a web browser), a program interface, or an application programming interface (API).

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6.0 Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 10 is a block diagram that illustrates computer system 1000 upon which an embodiment of the invention may be implemented. Computer system 1000 includes bus 1002 or other communication mechanism for communicating information, and a hardware processor 1004 coupled with bus 1002 for processing information. Hardware processor 1004 may be, for example, a general purpose microprocessor.

Computer system 1000 also includes main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes read only memory (ROM) 1008 or other static storage device coupled to bus 1002 for storing static information and instructions for processor 1004. Storage device 1010, such as a magnetic disk or optical disk, is provided and coupled to bus 1002 for storing information and instructions.

Computer system 1000 may be coupled via bus 1002 to display 1012, such as a cathode ray tube (CRT) or light emitting diode (LED) monitor, for displaying information to a computer user. Input device 1014, which may include alphanumeric and other keys, is coupled to bus 1002 for communicating information and command selections to processor 1004. Another type of user input device is cursor control 1016, such as a mouse, a trackball, touchscreen, or cursor direction keys for communicating direction information and command selections to processor 1004 and for controlling cursor movement on display 1012. Input device 1014 typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 1000 can receive the data on the network line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

8.0. Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    training an anomaly detection model to learn a plurality of anomaly regions within a multidimensional space including two or more dimensions of a computing application, wherein training the anomaly detection model comprises partitioning the multidimensional space into quadrants based on a quantile point within a set of training data;
    storing a mapping between each respective anomaly region of the plurality of anomaly regions and a respective anomaly classifier from a set of anomaly classifiers;
    evaluating a set of metrics for the computing application using the trained anomaly detection model to detect an anomaly in the computing application;
    assigning, based at least in part on the mapping, a particular anomaly classifier to the anomaly from the set of anomaly classifiers;
    performing a responsive action to address the anomaly based at least in part on the particular anomaly classifier.

2. The method of claim 1, wherein different anomaly regions of the plurality of anomaly regions correspond to different combinations of anomalous values within the set of metrics.

3. The method of claim 1, wherein the plurality of anomaly regions are orthogonal sections of the multidimensional space.

4. The method of claim 1, wherein the plurality of anomaly regions are determined, based at least in part, on a point having coordinates that represent a threshold quantile of positive-class support vector coordinates.

5. The method of claim 1, wherein training the anomaly detection model to learn the plurality of anomaly regions within a multidimensional space comprises determining boundaries for the plurality of anomaly regions based on learned relationships between different metrics in the set of metrics.

6. The method of claim 1, wherein evaluating the set of metrics for the computing application using the trained anomaly detection model comprises: identifying an anomaly region of a plurality of anomaly regions where at least one data point in the set of metrics is located.

7. The method of claim 6, wherein evaluating the set of metrics for the computing application using the trained anomaly detection model further comprises: generating a bit vector for the at least one data point in the set of metrics; and comparing coordinates associated with the plurality of anomaly regions against the bit vector; wherein identifying the anomaly region where the at least one data point in the set of metrics is located is performed based on said comparing.

8. The method of claim 1, wherein the anomaly classifier indicates a cause of anomalous behavior within the computing application.

9. The method of claim 1, wherein the responsive action comprises performing at least one of applying a patch, restarting a resource, shutting down a resource, migrating a resource, or adjusting a resource configuration for one or more resources used to run the computing application.

10. One or more non-transitory computer-readable media storing instructions, which when executed by one or more hardware processors, cause:
    training an anomaly detection model to learn a plurality of anomaly regions within a multidimensional space including two or more dimensions of a computing application, wherein training the anomaly detection model comprises partitioning the multidimensional space into quadrants based on a quantile point within a set of training data;
    storing a mapping between each respective anomaly region of the plurality of anomaly regions and a respective anomaly classifier from a set of anomaly classifiers;
    evaluating a set of metrics for the computing application using the trained anomaly detection model to detect an anomaly in the computing application;

assigning, based at least in part on the mapping, a particular anomaly classifier to the anomaly from the set of anomaly classifiers;

performing a responsive action to address the anomaly based at least in part on the particular anomaly classifier.

11. The one or more non-transitory computer-readable media of claim 10, wherein different anomaly regions of the plurality of anomaly regions correspond to different combinations of anomalous values within the set of metrics.

12. The one or more non-transitory computer-readable media of claim 10, wherein the plurality of anomaly regions are orthogonal sections of the multidimensional space.

13. The one or more non-transitory computer-readable media of claim 10, wherein the plurality of anomaly regions are determined, based at least in part, on a point having coordinates that represent a threshold quantile of positive-class support vector coordinates.

14. The one or more non-transitory computer-readable media of claim 10, wherein training the anomaly detection model to learn the plurality of anomaly regions within a multidimensional space comprises determining boundaries for the plurality of anomaly regions based on learned relationships between different metrics in the set of metrics.

15. The one or more non-transitory computer-readable media of claim 10, wherein evaluating the set of metrics for the computing application using the trained anomaly detection model comprises: identifying an anomaly region of a plurality of anomaly regions where at least one data point in the set of metrics is located.

16. The one or more non-transitory computer-readable media of claim 15, wherein evaluating the set of metrics for the computing application using the trained anomaly detection model further comprises: generating a bit vector for the at least one data point in the set of metrics; and comparing coordinates associated with the plurality of anomaly regions against the bit vector; wherein identifying the anomaly region where the at least one data point in the set of metrics is located is performed based on said comparing.

17. The one or more non-transitory computer-readable media of claim 10, wherein the anomaly classifier indicates a cause of anomalous behavior within the computing application.

18. The one or more non-transitory computer-readable media of claim 10, wherein the responsive action comprises performing at least one of applying a patch, restarting a resource, shutting down a resource, migrating a resource, or adjusting a resource configuration for one or more resources used to run the computing application.

19. A system comprising:
one or more hardware processors;
one or more non-transitory computer-readable media storing instructions, which when executed by one or more hardware processors, cause:
training an anomaly detection model to learn a plurality of anomaly regions within a multidimensional space including two or more dimensions of a computing application, wherein training the anomaly detection model comprises partitioning the multidimensional space into quadrants based on a quantile point within a set of training data;
storing a mapping between each respective anomaly region of the plurality of anomaly regions and a respective anomaly classifier from a set of anomaly classifiers;
evaluating a set of metrics for the computing application using the trained anomaly detection model to detect an anomaly in the computing application;
assigning, based at least in part on the mapping, a particular anomaly classifier to the anomaly from the set of anomaly classifiers;
performing a responsive action to address the anomaly based at least in part on the particular anomaly classifier.

20. The system of claim 19, wherein different anomaly regions of the plurality of anomaly regions correspond to different combinations of anomalous values within the set of metrics.

* * * * *

UNITED STATES PATENT AND TRADEMARK OFFICE
CERTIFICATE OF CORRECTION

| | |
|---|---|
| PATENT NO. | : 11,949,703 B2 |
| APPLICATION NO. | : 18/055773 |
| DATED | : April 2, 2024 |
| INVENTOR(S) | : Salunke et al. |

It is certified that error appears in the above-identified patent and that said Letters Patent is hereby corrected as shown below:

On the Title Page

On page 2, Column 1, item (56) under U.S. Patent Documents, Line 27, delete "Mswanathan" and insert -- Viswanathan --, therefor.

In the Specification

In Column 14, Line 36, delete ""4","  and insert -- "-1", --, therefor.

In Column 15, Line 59, delete ""4","  and insert -- "-1", --, therefor.

In Column 20, Line 37, delete "is" and insert -- it --, therefor.

In Column 21, Line 36, delete "labels" and insert -- labels. --, therefor.

In Column 22, Line 1, delete "bee" and insert -- be --, therefor.

In Column 22, Line 29, delete """Load" and insert -- "Load --, therefor.

In Column 30, Line 41, delete "located" and insert -- located, --, therefor.

Signed and Sealed this
Sixth Day of August, 2024

Katherine Kelly Vidal
*Director of the United States Patent and Trademark Office*